(12) United States Patent
Chretien et al.

(10) Patent No.: US 10,554,157 B2
(45) Date of Patent: Feb. 4, 2020

(54) DRIVE CIRCUIT FOR ELECTRIC MOTORS

(71) Applicant: Regal Beloit America, Inc., Beloit, WI (US)

(72) Inventors: Ludovic Andre Chretien, Columbia City, IN (US); Paul Bryan Snipes, Tipp City, OH (US)

(73) Assignee: Regal Beloit America, Inc., Beloit, WI (US)

( * ) Notice: Subject to any disclaimer, the term of this patent is extended or adjusted under 35 U.S.C. 154(b) by 238 days.

(21) Appl. No.: 15/826,414

(22) Filed: Nov. 29, 2017

(65) Prior Publication Data

US 2019/0165702 A1 May 30, 2019

(51) Int. Cl.
*H02P 5/74* (2006.01)
*H02K 44/02* (2006.01)
*H02P 21/00* (2016.01)
*H02P 25/062* (2016.01)

(52) U.S. Cl.
CPC .............. *H02P 5/74* (2013.01); *H02K 44/02* (2013.01); *H02P 21/50* (2016.02); *H02P 25/062* (2016.02)

(58) Field of Classification Search
USPC ......................................................... 318/112
See application file for complete search history.

(56) References Cited

U.S. PATENT DOCUMENTS

| | | | | |
|---|---|---|---|---|
| 4,335,337 A | * | 6/1982 | Okamatsu | B60L 3/102 318/52 |
| 4,825,131 A | * | 4/1989 | Nozaki | B60L 9/22 180/197 |
| 5,345,155 A | * | 9/1994 | Masaki | B60L 15/2036 318/400.07 |
| 6,043,617 A | * | 3/2000 | Matsumoto | H02P 5/74 180/65.51 |
| 6,586,898 B2 | | 7/2003 | King et al. | |
| 7,906,925 B2 | | 3/2011 | Takeuchi | |
| 8,179,068 B2 | | 5/2012 | Yuuki et al. | |
| 8,552,678 B2 | | 10/2013 | Yuuki et al. | |
| 8,884,576 B2 | | 11/2014 | Yuuki et al. | |
| 9,048,767 B2 | | 6/2015 | Rozman et al. | |
| 9,602,035 B2 | * | 3/2017 | Tsukakoshi | H02P 27/04 |
| 9,680,406 B2 | | 6/2017 | Yuuki et al. | |
| 9,966,880 B2 | * | 5/2018 | Cho | H02P 5/46 |
| 10,003,284 B2 | * | 6/2018 | Cho | H02P 21/22 |
| 2017/0250622 A1 | | 8/2017 | Krolak et al. | |

FOREIGN PATENT DOCUMENTS

WO 2016173191 A1 11/2016
WO 2017113511 A1 7/2017

* cited by examiner

*Primary Examiner* — Bentsu Ro
(74) *Attorney, Agent, or Firm* — Armstrong Teasdale LLP

(57) ABSTRACT

A method of operating a drive circuit for parallel electric motors is provided. The method includes receiving measurements of stator phase currents in the parallel electric motors. The method includes selecting a target PM motor, from among the parallel electric motors, that generates a largest torque output. The method includes executing a vector control algorithm to generate a complex command voltage vector for the target PM motor. The method includes generating and transmitting a pulse width modulation (PWM) signal based on the complex command voltage vector for controlling an inverter. The method includes operating the inverter according to the PWM signal to supply three-phase alternating current (AC) power to the parallel electric motors.

24 Claims, 14 Drawing Sheets

DRIVE CIRCUIT FOR ELECTRIC MOTORS

BACKGROUND

The field of the disclosure relates generally to a drive circuit for electric motors and, more specifically, a drive circuit that operates two or more electric motors in parallel with a single inverter or single drive device. The electric motors may be permanent magnet (PM) motors or induction motors.

PM electric motors are operated synchronously in that the rotor turns at a speed that matches the speed at which a rotating magnetic field generated by the stator turns. The stator and rotor of a PM motor, or synchronous motor, are energized independently, generally with an alternating current (AC) supplied to the stator windings. In contrast, induction motors operate asynchronously, i.e., the rotor turns at a speed that lags the speed of the stator rotating magnetic field, i.e., the synchronous speed. The relative speed of the rotor and the rotating magnetic field induces the rotor current.

Generally, PM motors are more efficient, but tend to be more complex and often costlier than their counterpart induction motors. At least some PM motors are driven utilizing a vector control scheme that independently monitors and controls motor torque and motor flux, i.e., monitors rotor position and phase currents, and independently controls torque current and flux current via a complex voltage (i.e., a voltage amplitude and phase represented in a complex plane). For a given PM motor, torque current and flux current are controlled over time by a pulse width modulated (PWM) signal that controls switching in an inverter that supplies, for example, three-phase current to the stator windings. Such control may be accomplished, for example, using vector control. A three-phase PWM voltage signal for energizing the stator windings is generated based on a complex voltage vector in a rotating rotor reference frame. The complex voltage vector is derived using, for example, a vector control algorithm executing on a digital signal processor (DSP) or other suitable processor for controlling the inverter.

Vector control algorithms are generally known. An exemplary vector control algorithm begins with measured stator phase currents that are transformed to the rotating rotor reference frame. The rotating rotor reference frame is derived from the rotor position, which is either measured directly or integrated from a measured rotor speed or inferred through mathematical models. For each phase, a rotor flux linkage vector is estimated based on the stator current vector and the magnetizing inductance of the stator coil. The rotor flux linkage vector gives a rotor angle that enables the stator current vector to be converted to a (d,q) coordinate system in the rotating rotor reference frame. The (d,q) coordinate system, sometimes referred to as the flux-torque coordinate system, represents a complex current vector with orthogonal components along a direct axis (d) and a quadrature axis (q) such that a field flux linkage component of the complex current vector aligns with the d-axis and a torque, or armature flux, component aligns with the q-axis. Once the stator current vector is represented in the (d,q) coordinate system, its components may be controlled using traditional scalar control, including, for example, proportional and integral (PI) control, that produce a complex commanded voltage vector in the (d,q) coordinate system. The complex commanded voltage vector is then converted back to the original rotating rotor reference frame and is the basis for generating a PWM voltage signal for controlling an inverter that energizes the stator windings.

At least some motor applications can utilize multiple, smaller and more efficient motors in parallel to improve output or efficiency. Such applications may include heating, ventilation, and air conditioning (HVAC), refrigeration, compression, pumps, or other fluid-moving equipment, as well as electric drives for wheels, gears, belts, or other mechanical loads. Induction motors are often utilized in such applications due to their relative simplicity and ability to operate asynchronously, i.e., to allow "slip" between rotor rotation and magnetic field rotation, thereby simplifying loading of each motor. Conversely, each PM motor in a multi-motor application typically requires a dedicated PM drive to generate the appropriate PWM signal to operate the motor synchronously for its particular load. Consequently, each PM drive is generally rated for full output power required for the application, resulting in higher costs, lower efficiency, and more complex configuration and installation. Alternatively, and notably less practical, multiple PM motors or induction motors may be combined in parallel with a single drive, but is generally impractical, because loading on the various motors is not known or controlled well enough to balance loads among the parallel motors. Consequently, in such applications, the motors operate at varying speeds under varying loads that could lead to stability challenges and motor damage, if they operate at all. Furthermore, connecting and operating multiple PM motors on a single inverter that must function as the same synchronous speeds present much more difficulty as variability in loading will cause instabilities and finally loss of synchronism in the system.

BRIEF DESCRIPTION

In one aspect, a method of operating a drive circuit for parallel electric motors, at least one of which is a PM motor, is provided. The method includes receiving measurements of stator phase currents in the parallel electric motors. The method includes selecting a target PM motor, from among the parallel electric motors, that generates a largest torque output. The method includes executing a vector control algorithm to generate a complex command voltage vector for the target PM motor. The method includes generating and transmitting a pulse width modulation (PWM) signal based on the complex command voltage vector for controlling an inverter. The method includes operating the inverter according to the PWM signal to supply three-phase alternating current (AC) power to the parallel electric motors.

In another aspect, a drive circuit for parallel electric motors, at least one of which is a PM motor, is provided. The drive circuit includes an inverter and a DSP. The inverter is coupled to the parallel electric motors and is configured to supply an alternating current (AC) signal to stator windings thereof based on a PWM signal generated by the DSP. The DSP is coupled to the inverter and is configured to receive respective stator phase current measurements for the parallel electric motors. The DSP is further configured to select a target PM motor, of the parallel electric motors, having a largest torque output among the parallel electric motors. The DSP is further configured to execute a vector control algorithm to generate a complex command voltage vector for the target PM motor. The DSP is further configured to generate the PWM signal based on the complex command voltage vector for the target PM motor. The DSP is further configured to transmit the PWM signal to the inverter to operate the inverter and supply the AC signal to the stator windings of the parallel electric motors.

In yet another aspect, a system is provided. The system includes a first three-phase motor, an inverter, an induction motor, a three-phase AC line-frequency bus, and a DSP. The first three-phase motor is configured to drive a load. The inverter is coupled to the first three-phase motor and is configured to supply a three-phase output power thereto. The induction motor is configured to drive the load, and is further configured to be selectively coupled in parallel to the first three-phase motor and the inverter. The three-phase AC line-frequency bus is configured to be selectively coupled to the induction motor. The DSP is coupled to the inverter and is configured to selectively, when in a direct operating mode, couple the induction motor to the three-phase AC line-frequency bus, and decouple the induction motor from the first three-phase motor and the inverter. The DSP is further configured to selectively, when in a parallel operating mode, couple the induction motor to the inverter, and decouple the induction motor from the three-phase AC line-frequency bus. The DSP is further configured to control the inverter to supply the three-phase output power from the inverter to the first three-phase motor. The DSP is further configured to control the inverter to supply the three-phase output power from the inverter to the induction motor when in the parallel operating mode.

In yet another aspect, a method of controlling fluid flow generated by fluid-moving equipment driven by a plurality of motors is provided. The method includes receiving a fluid flow demand signal indicating an amount of fluid flow commanded to be output by the fluid-moving equipment driven by the plurality of motors. The method includes determining a state of operation, of a plurality of predefined states of operation, in which to operate a drive circuit coupled to the plurality of motors to generate the commanded amount of fluid flow. The method includes adjusting at least one relay associated with at least one of the plurality of motors to activate and selectively couple the at least one motor to an inverter or an AC line-frequency power according to the determined state of operation. The method includes adjusting operation of the inverter to generate the commanded amount of fluid flow.

DETAILED DESCRIPTION

Figure 1:
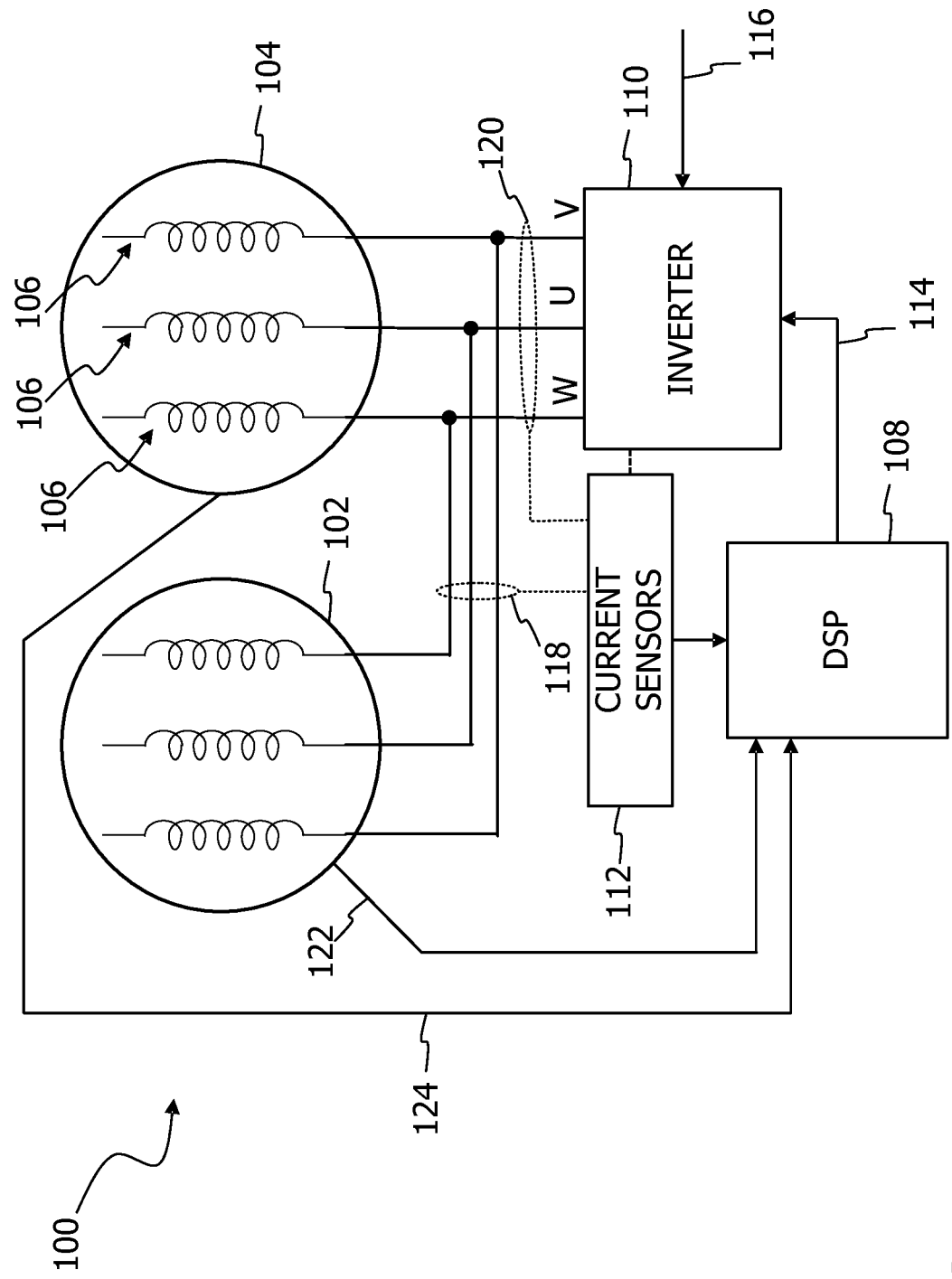
FIG. 1 is a block diagram of an exemplary drive circuit for parallel motors.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

It is realized herein that multiple electric motors may be operated by a single inverter or drive device, including one or more PM motors or induction motors in combination with one or more PM or induction motor. The drive circuits and methods of operation described herein provide parallel drive, using a single inverter, of two or more motors, operating under different load conditions and/or at different speeds. For example, parallel PM motors operate at a same speed, but may operate under different load conditions. Embodiments of the drive circuits described herein provide estimation of rotor position and monitoring of phase currents in parallel motors. Embodiments of the drive circuits and methods control the inverter to operate each of the parallel motors, and synchronize on the PM motor having the largest torque output, i.e., a largest load. In embodiments where only one PM motor is in parallel with one or more induction motor, the drive circuits and methods synchronize on the one PM motor. Each other parallel motor, whether a PM motor or an induction motor, is operated by the inverter using the same complex command voltage vector transformed into a PWM signal. In doing so, the drive circuits and methods described herein dissipate excess current in the stator windings of the other parallel motors in the form of an additional flux current to resolve the complex command voltage vector that is the basis for the PWM signal that controls the single inverter for all the parallel motors. The additional flux current enables each PM motor to synchronize and stabilize when loading on the parallel PM motors is imbalanced and torque outputs vary, while speed remains at the synchronous speed, among the parallel PM motors. Further, in parallel induction motors, the excess current in the stator windings is dissipated in the form of slip, because the induction motor operates asynchronously. In certain embodiments, where an induction motor is in parallel with a PM or induction motor, the drive circuit selectively operates the second induction motor "across the line," i.e., powered by a line frequency AC signal and bypassing the inverter, or operated by the inverter in parallel with the first motor to which the drive circuit synchronizes. In such embodiments, the parallel motors have the flexibility to satisfy a variable load via the first motor with a parallel induction motor under partial loading, the first motor in combination with an induction motor under partial-to-full loading, or the first motor alone for full-to-low loading.

It is further realized herein, in embodiments of the drive circuit, the single inverter that operates parallel motors should be controlled by a DSP, or other suitable processor, executing, for example, a vector control algorithm that produces a complex command voltage vector on which a PWM signal is based for controlling each phase of the inverter. The DSP and inverter, in certain embodiments, may be co-located within the drive circuit. In other embodiments, the DSP is remote from the inverter. In certain embodiments, the drive circuit, including the DSP and/or inverter, is disposed centrally with respect to the multiple parallel motors. In alternative embodiments, the drive circuit may be incorporated, for example, into the package of one of the parallel PM motors.

FIG. 1 is a block diagram of an exemplary drive circuit 100 for parallel motors 102 and 104, at least one of which is a PM motor. Each of motors 102 and 104 includes a rotor (not shown) and a stator, including stator windings 106. Notably, motors 102 and 104 are coupled in parallel to drive circuit 100. Drive circuit 100 includes a DSP 108, an inverter 110, and current sensors 112.

Current sensors 112 include any device that is operable to produce a signal that represents current amplitude. For example, current sensors 112 may include shunt sensing resistors, current transformers, hall-effect current measurement integrated circuits, or any other suitable device for measuring current.

DSP 108 executes a control algorithm, such as, for example, a vector control algorithm, for controlling inverter 110. More specifically, DSP 108 transmits one or more PWM signals 114 to inverter 110 to control the operation of various switches and power electronics (not shown) within inverter 110. Inverter 110, during operation, converts an input power 116, such as, for example, a DC power or an AC rectified power, to three-phase power for energizing stator windings 106 of motors 102 and 104. In such an embodiment, DSP 108 may transmit a PWM signal 114 for each phase of inverter 110 to generate the three phases of output power (W, U, V). DSP 108 generates a given PWM signal 114 based on stator current measurements collected by current sensors 112. Stator current measurements for each phase of each motor may be determined based on current sensors couple to various portions of drive circuit 100, including, for example, within inverter 110, individual phase leg measurements 118, collective measurements 120 at the output of inverter 110, or any combination thereof.

DSP 108 is further configured to generate a given PWM signal 114 based on rotor position of one or more of motors 102 and 104. Drive circuit 100 receives rotor speed measurements 122 and 124 from motors 102 and 104, respectively. Rotor speed measurements 122 and 124 may be integrated over time to determine a rotor position. Rotor speed may be measured by respective sensors (not shown) coupled to motors 102 and 104. In certain embodiments, rotor speed is derived from the output frequency of three-phase power (W, U, V) of inverter 110. In alternative embodiments, rotor position is measured directly. In other embodiments, DSP 108 executes a position-sensorless vector control algorithm and rotor speeds measurements 122 and 124 are not used.

Figure 2:
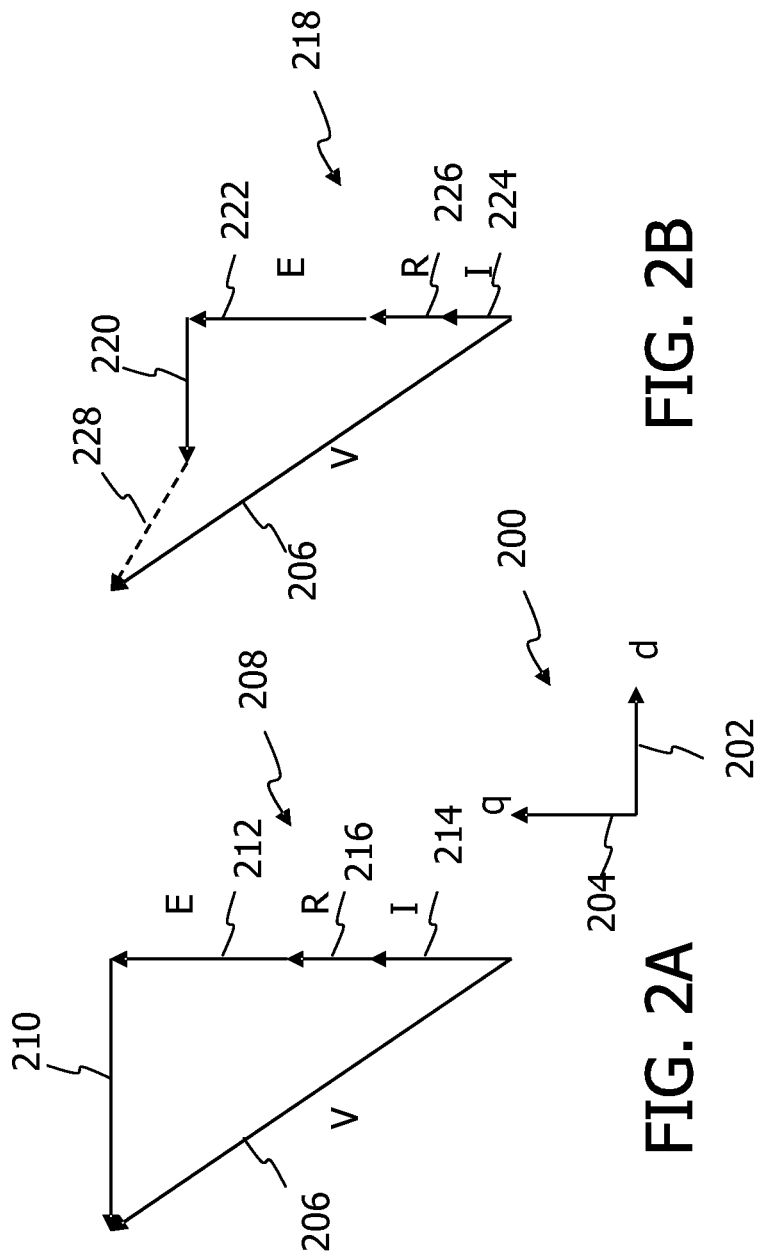
FIGS. 2A and 2B are graphs of exemplary complex command voltage vectors for parallel motors in a (d,q) coordinate system in a rotating rotor reference frame.

FIGS. 2A and 2B are graphs of exemplary complex command voltage vectors for parallel motors, at least one of which is a PM motor, such as motors 102 and 104 shown in FIG. 1, in a (d,q) coordinate system 200 in a rotating rotor reference frame. (d,q) coordinate system 200 is defined by a direct (d) axis 202 representing flux and a quadrature (q) axis 204 representing torque, the positions of which are determined as a function of the rotor angle derived from the rotor flux linkage vector estimated according to the rotor position and stator current.

FIG. 2A illustrates a command voltage vector 206 for a first PM motor having the greatest torque output among the parallel PM motors. Accordingly, command voltage vector 206 is illustrated as a vector sum of a torque component 208 and a flux component 210. Torque component 208 is a sum of a back electromagnetic force (EMF) voltage vector 212 (E) and the product of a torque current vector 214 (I) and scaled by a resistance 216 (R), and projected onto the q axis. The magnitude of flux component 210 of command voltage vector 206 is computed as:

$$-P \cdot L_q \cdot \omega \cdot I_{q1},$$

where P is a quantity of pole-pairs in the motor, $L_q$ is stator winding inductance, $\omega$ is the frequency at which the synchronous motor turns, and $I_{q1}$ is the torque current.

FIG. 2B illustrates command voltage vector 206 applied to a second motor in parallel with the first PM motor represented in FIG. 2A. Command voltage vector 206 likewise has a torque component 218 and a flux component 220, both of which are of lesser magnitude than torque component 208 and flux component 210 shown in FIG. 2A, given that each is at least partially determined as a function of torque output, which is less in the second motor. Torque component 218, as in FIG. 2A, is a sum of a back EMF voltage vector 222 (E) and the product of a torque current vector 224 (I) and scaled by a resistance 226 (R), and projected onto the q axis. Given that the first PM motor has the greatest torque output, torque current vector 224 must have a lesser magnitude than torque current vector 214 shown in FIG. 2A. Resistance scalar 216 and resistance scalar 226 are assumed substantially equal, as are back EMF voltage vectors 212 and 222 for equivalent motors. In certain embodiments, where the parallel PM motors are not equivalent machines, the resistance vectors and back EMF vectors would vary, but are generally known for a given motor.

Command voltage vector 206, when applied to the second motor represented in FIG. 2B, delivers more current than is necessary to the stator windings to produce the demanded torque output, i.e., the torque producing current, $I_{q2}$, is less than in the first PM motor. Consequently, the excess current is dissipated by the second motor in the form of an additional flux current 228, which mathematically satisfies the vector control algorithm.

Figure 3:
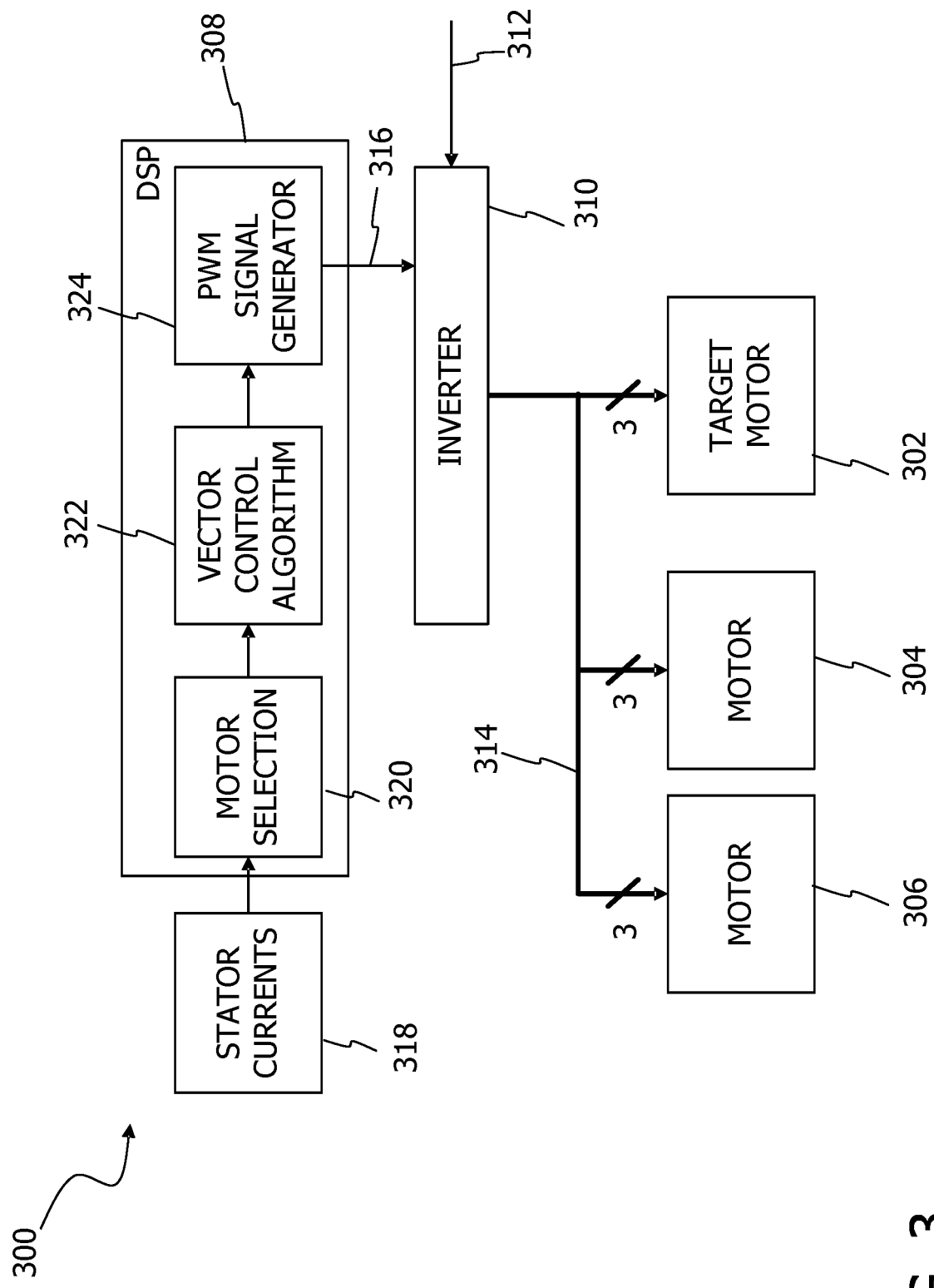
FIG. 3 is a functional block diagram of an exemplary drive circuit.

FIG. 3 is a functional block diagram of an exemplary drive circuit 300 for operating parallel motors 302, 304, and 306, including at least one PM motor 302. Motors 304 and 306 may each be parallel PM motors or induction motors. In the embodiment of FIG. 3, motors 302, 304, and 306 are three-phase motors. Drive circuit 300 operates at least two motors in parallel. In alternative embodiments, for example, drive circuit 300 operates two parallel motors. In other embodiments, drive circuit 300 operates four or more parallel motors. In the embodiment of FIG. 3, drive circuit 300 operates three motors in parallel. In certain embodiments, one or more of the parallel motors may be selectively operated by drive circuit 300 or, when the parallel motors are induction motors, may be operated directly across line frequency power from, for example, a utility or an AC generator.

Drive circuit 300 includes a DSP 308 coupled to an inverter 310. Inverter 310 converts an input power 312 to three-phase AC power 314 that is supplied to the stator windings of motors 302, 304, and 306. In the embodiment of FIG. 3, input power 312 is DC power. In alternative embodiments, input power 312 may include an AC power supply and inverter 310 is combined with a rectifier (not shown) to transform the input AC power to an appropriate three-phase AC power 314 to be supplied to motors 302, 304, and 306. Inverter 310 is controlled by one or more PWM signals 316 generated by and transmitted from DSP 308. For example, when operating three-phase motors, DSP 308 may transmit a PWM signal 316 for independently controlling each phase leg in inverter 310.

DSP 308 controls inverter 310 based at least in part on stator currents 318 measured or otherwise determined in each of motors 302, 304, and 306. Stator currents 318 are time varying signals indicating at least the amplitude and phase of the current supplied to each phase of the respective stators of motors 302, 304, and 306. DSP 308 may further control inverter 310 based on respective positions and/or speeds of the rotors of motors 302, 304, and 306 as measured or otherwise determined. For example, in certain embodiments, PM motor speed, i.e., the speed at which the rotor turns, is monitored, as it is approximately the same as the frequency of the current supplied to the stator windings. The PM motor speed may then be integrated over time to determine its rotor position. In other embodiments, a position sensorless vector control algorithm may be used to estimate the rotor speeds and positions without the use of a position sensor.

DSP 308 includes several functional modules for controlling inverter 310. Namely, DSP 308 includes a motor selection module 320, a vector control algorithm 322, and a PWM signal generator 324. Each of these modules, among others, are implemented in software or firmware, or otherwise programmed onto DSP 308 to be executed by DSP 308 for carrying out their respective functions.

Motor selection module 320 determines which of motors 302, 304, and 306 should be the target of synchronizing using vector control algorithm 322. Although PM motor 302 is indicated as the target PM motor, motor selection module 320 may select any of motors 302, 304, and 306 based on their respective torque outputs. More specifically, motor selection module 320 determines which of motors 302, 304, and 306 is producing the greatest torque output, and selects that motor, e.g., PM motor 302, to be the target of synchronizing using vector control algorithm 322. In certain embodiments, motor selection module 320 makes this determination based on stator currents 318. For example, motor selection module 320 receives stator currents 318 for each of motors 302, 304, and 306. Motor selection module 320 then determines which of motors 302, 304, and 306 is drawing the greatest torque producing current through its respective stator windings. The current conducted through the stator windings correlates to the torque output of a given motor. Accordingly, the motor drawing the greatest torque producing current correlates to the motor generating the greatest torque output.

As noted above, at least one of motors 302, 304, and 306 is a PM motor. Motor selection module 320 only selects a PM motor from among the parallel motors to be the target of synchronization by vector control algorithm 322. In embodiments where one or both of motors 304 and 306 are induction motors, an induction motor is not selected by motor selection module 320, because such an induction motor operates asynchronously and is not amenable to synchronization by vector control algorithm 322.

In the embodiment of FIG. 3, motor selection module 320 determines PM motor 302 is generating the greatest torque output among motors 302, 304, and 306. DSP 308 then executes vector control algorithm 322 with respect to target PM motor 302. Vector control algorithm 322 generates a complex command voltage vector, such as, for example, command voltage vector 206 shown in FIG. 2A, that will be the basis for PWM signals 316 generated by PWM signal generator 324. Vector control algorithm 322 computes the command voltage vector based at least on stator currents 318 for the selected motor, e.g., PM motor 302. Vector control algorithm computes the complex command voltage vector, expressed in a rotating rotor reference frame and in the (d,q) coordinate system, to provide an efficient balance of torque current and flux current to the stator windings (not shown) of PM motor 302. Torque current and flux current each result in a respective voltage drop. These voltage drops are illustrated, for example, as torque component 208 and flux component 210 shown in FIG. 2A. The torque current results in a voltage drop along the d-axis, e.g., the flux component, and the flux current results in a voltage drop along the q-axis, e.g., the torque component 208. Vector control algorithm 322 includes a scalar control portion to independently compute these voltage drops, which are then translated to the complex command voltage vector that is transmitted to PWM signal generator 324.

PWM signal generator 324 generates one or more PWM signals for controlling inverter 310. For example, in one embodiment, PWM signal generator 324 generates a PWM signal 316 for controlling each phase leg within inverter 310. Given that inverter 310 provides the same three-phase AC power 314 to each of motors 302, 304, and 306, each motor of motors 302, 304, and 306 is thereby controlled by the same complex command voltage vector that results from vector control algorithm 322 executing on the targeted PM motor 302. Consequently, as shown in FIG. 2B, excess current in the stator windings of motors 304 and 306 is dissipated in the form of additional flux current 228.

Figure 4:
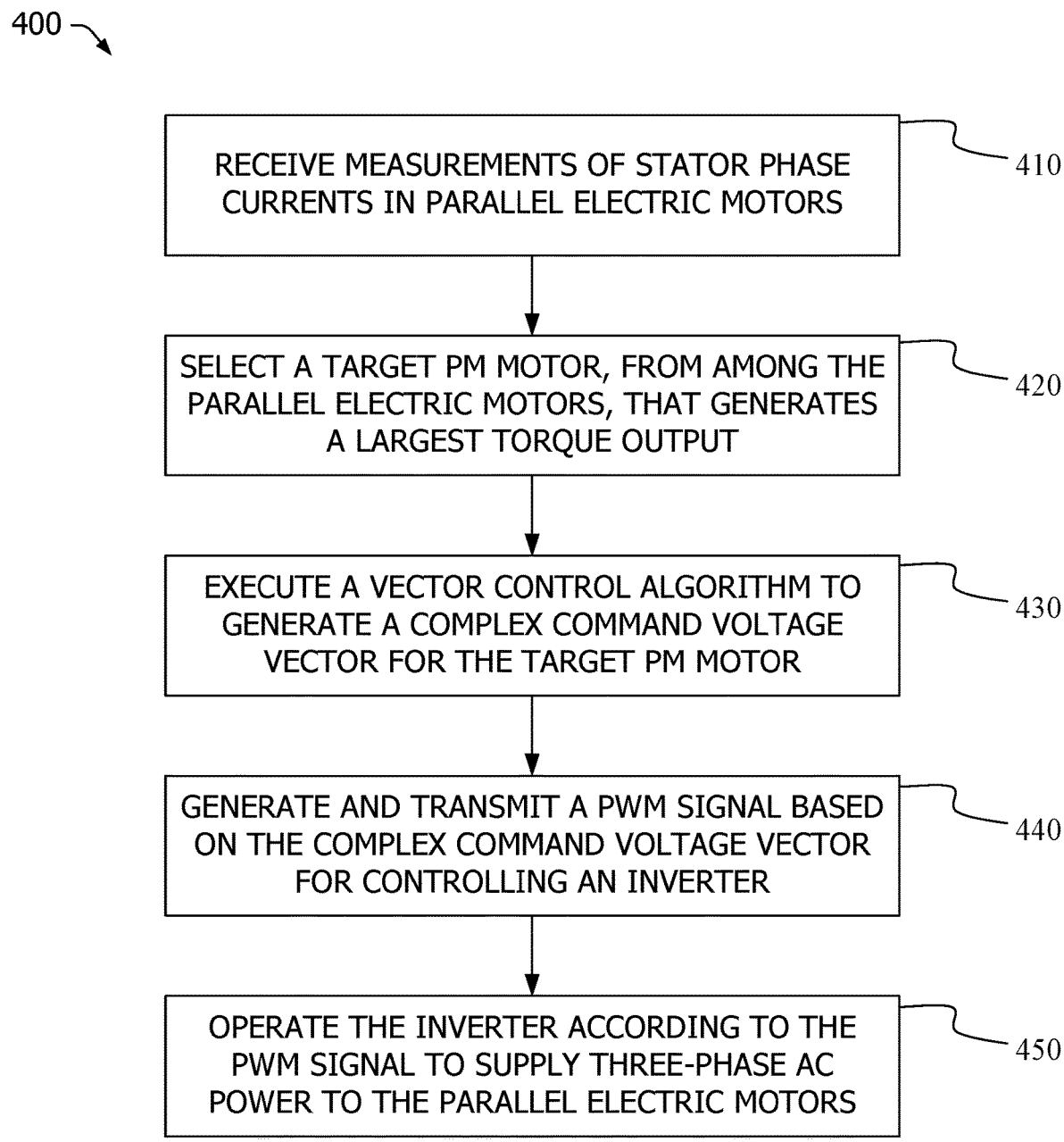
FIG. 4 is a flow diagram of an exemplary method of operating the drive circuit shown in FIG. 3.

FIG. 4 is a flow diagram of an exemplary method 400 of operating drive circuit 300, shown in FIG. 3, for operating parallel electric motors, at least one of which is a PM motor. DSP 308 receives 410 stator currents 318 measured or otherwise determined for the respective phases of each of the parallel electric motors 302, 304, and 306. DSP 308 selects 420 target PM motor 302 from among the parallel electric motors 302, 304, and 306. DSP 308 selects 420 PM motor 302 based on its generating a largest torque output. DSP 308 executes 430 vector control algorithm 322 to generate a complex command voltage vector, such as command voltage vector 206 shown in FIG. 2A, for target PM motor 302. DSP 308 then generates and transmits 440 PWM signal 316 to inverter 310 based on the complex command voltage vector for controlling inverter 310. DSP 308 then operates 450 inverter 310 according to PWM signal 316 to supply three-phase AC power 314 to parallel electric motors 302, 304, and 306.

Figure 5:
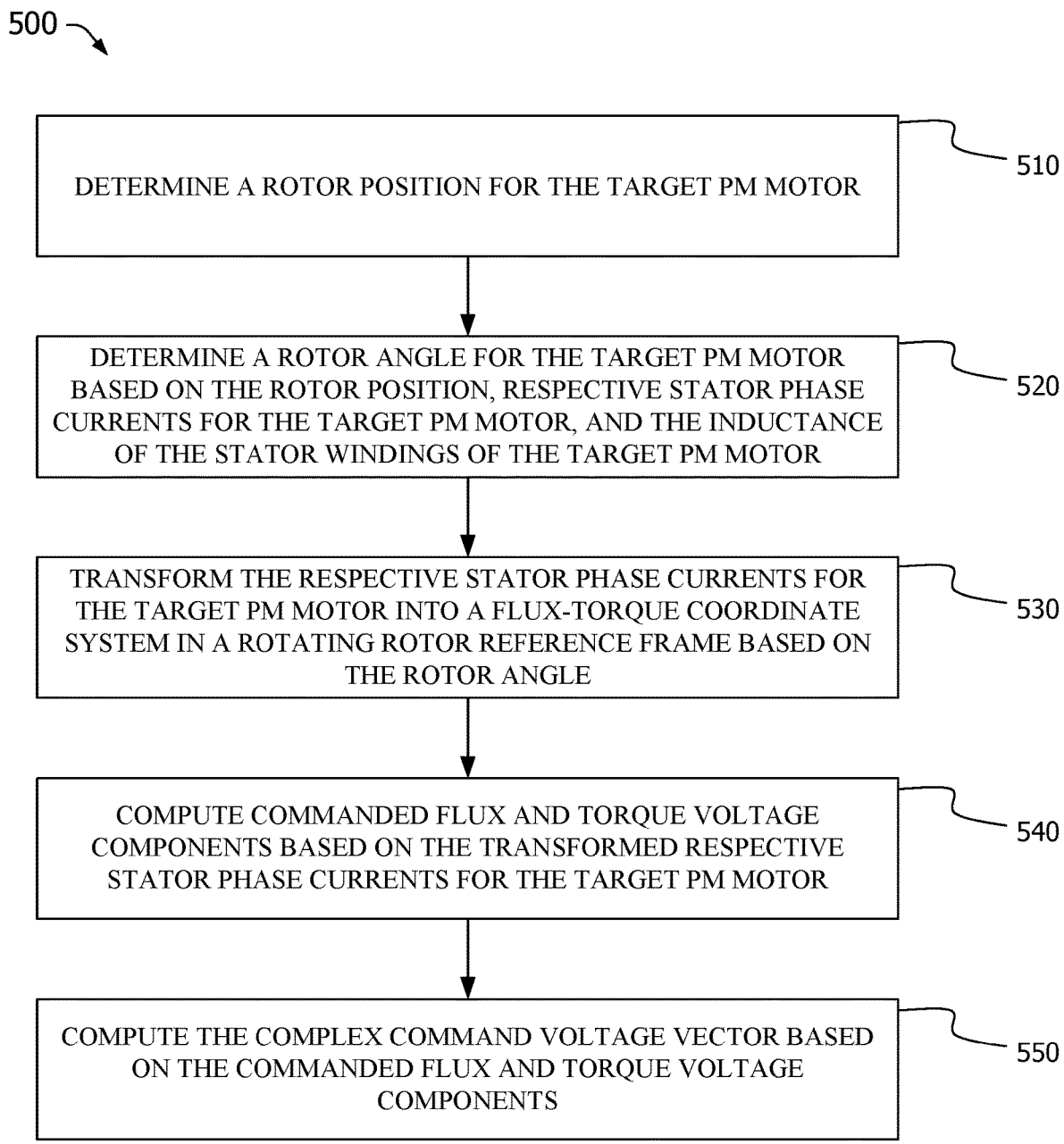
FIG. 5 is a flow diagram of an exemplary vector control method for use in the drive circuit shown in FIG. 3.

FIG. 5 is a flow diagram of an exemplary vector control method 500, such as, for example, vector control algorithm 322, for use in drive circuit 300, both shown in FIG. 3. Vector control method 500 is generally implemented within DSP 308 and begins with determining 510 a rotor position for target PM motor 302 based on a directly measured position or, in certain embodiments, from a position sensorless rotor angle estimator. Given knowledge of the rotor angle, a flux-torque (d,q) coordinate system is defined in which flux and torque component vectors are calculated. The respective stator phase currents for target PM motor 302 are then transformed 530 into the flux-torque coordinate system. DSP 308 then computes 540 commanded flux and torque voltage components using, for example, PI control methods, based on the stator phase currents for the target PM motor.

The complex command voltage vector is then computed 550 based on the computed commanded flux and torque voltage components.

Figure 6:
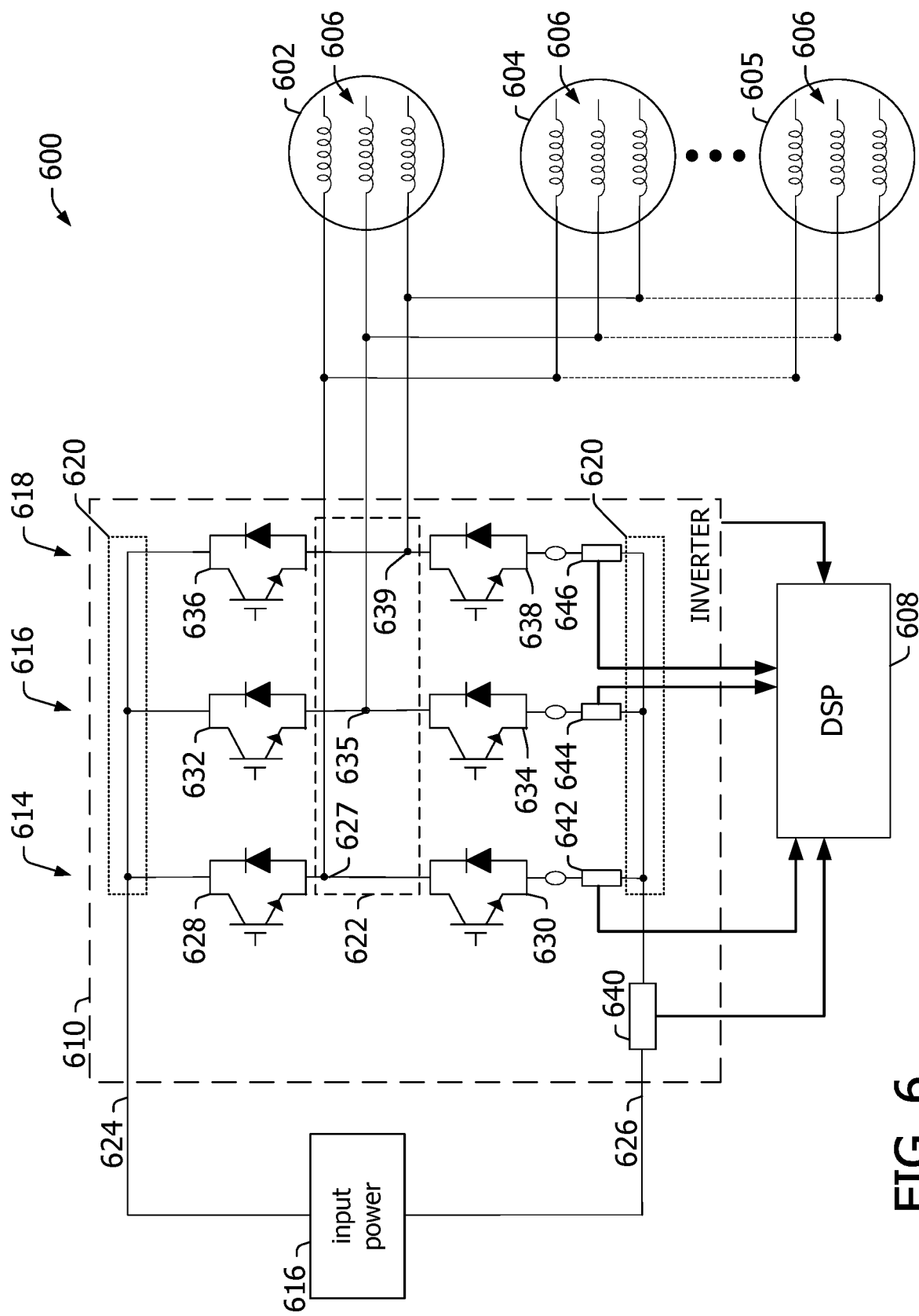
FIG. 6 is a schematic diagram of an exemplary drive circuit for use in the drive circuit shown in FIGS. 1 and 3.

FIG. 6 is a schematic diagram of an exemplary drive circuit 600 for a plurality of parallel electric motors, for example, a first motor 602 and a second motor 604, up to an nth motor 605. Motors 602, 604 . . . 605 may be PM motors, induction motors, or any combination thereof. In certain embodiments, at least one of motors 602, 604 . . . 605 is a PM motor. Each of motors 602, 604 . . . 605 includes a rotor (not shown) and a stator, including stator windings 606. Notably, motors 602, 604 . . . 605 are coupled in parallel to drive circuit 600. Drive circuit 600 includes a DSP 608, an inverter 610, and at least one current sensor 612. Current sensor 612 includes any device that is operable to produce a signal that represents current amplitude. For example, current sensors 612 may include shunt sensing resistors, current transformers, hall-effect current measurement integrated circuits, or any other suitable device for measuring current.

In the exemplary embodiment, inverter 610 is configured to be coupled to and provide three phase power to a plurality of parallel electric motors 602, 604 . . . 605. Inverter 610 is a three-phase voltage source inverter that is configured to convert input power 616 to three-phase power for energizing stator windings 606 of parallel motors 602, 604 . . . 605 based on control signals received from DSP 608.

In the exemplary embodiment, inverter 610 includes a first phase leg 614, a second phase leg 616, and a third phase leg 618. First, second, and third phase legs 614, 616, and 618 include a DC input stage 620 and an AC output stage 622. DC input stage 620 provides input power 116 to first, second, and third phase legs 614, 616, and 618 via a positive DC link rail 624 and a negative DC link rail 626. AC output stage 622 facilitates outputting stator phase currents from first, second, and third phase legs 614, 616, and 618 of inverter 610 to stator windings 606 of motors 602, 604 . . . 605.

More specifically, first phase leg 614 includes a first switch 628 and a second switch 630 serially-coupled between positive and negative DC link rails 624 and 626. A first output node 627 is defined between first and second switches 628 and 630, and is configured to be electrically connected to and provide a first stator phase current to a first-phase stator winding 606 of each motor 602, 604 . . . 605.

Additionally, second phase leg 616 includes a third switch 632 and a fourth switch 634 serially-coupled between positive and negative DC link rails 624 and 626. A second output node 635 is defined between third and fourth switches 632 and 634, and is configured to be electrically connected to and provide a second phase current to a second-phase stator winding 606 of each of motors 602, 604 . . . 605.

Moreover, third phase leg 618 includes a fifth switch 636 and a sixth switch 638 serially-coupled between positive and negative DC link rails 624 and 626. A third output node 639 is defined between fifth and sixth switches 636 and 638, and is configured to be electrically connected to and provide a third phase current to a third-phase stator winding 606 of each of motors 602, 604 . . . 605.

Drive circuit 600 includes at least one current sensor 612 coupled to inverter 610 and configured to measure stator phase currents output by inverter 610 for driving the plurality of parallel electric motors 602, 604 . . . 605. In the exemplary embodiment, current sensor 612 is a shunt resistor 640 coupled to DC input stage 620 and is configured to measure total current at DC input stage 620. More specifically, shunt resistor 640 is coupled in-line to negative DC link rail 626. Shunt resistor 640 measures DC link current of input power 616 along negative DC link rail 626.

DSP 608 receives the total current at the DC input stage 620 from shunt resistor 640. DSP 608 then determines electrical routes taken by currents flowing through inverter 610 based on known switching sequences of inverter 610. DSP 608 reconstructs stator phase currents for the plurality of parallel electric motors 602, 604 . . . 605 by correlating the determined electrical routes to total currents from shunt resistor 640 received over a time period. Each reconstructed stator phase current represents a total current on each particular phase from all of motors 602, 604 . . . 605. DSP 608 may determine average phase currents across motors 602, 604 . . . 605 by dividing the stator phase currents by the total number of paralleled motors 602, 604 . . . 605. DSP 608 then generates at least one PWM signal for controlling inverter 610 based on the reconstructed stator phase currents.

In an alternative embodiment, the at least one current sensor 612 includes at least two shunt resistors respectively coupled to two phase legs of first, second, and third phase legs 614, 616, and 618. For example, the at least two shunt resistors may include a first shunt resistor 642 coupled to first phase leg 614 and a second shunt resistor 644 coupled to second phase leg 616. However, this selection is described for exemplary purposes only and it should be understood that first and second shunt resistors 642 and 644 may be coupled with any selection to any of first, second, and third phase legs 614, 616, and 618. First shunt resistor 642 is coupled to first phase leg 614 at the DC input stage 620 and is configured to measure a stator phase current for first phase leg 614. The stator phase current for first phase leg 614 represents a sum of first phase currents for each of the plurality of parallel electric motors 602, 604 . . . 605. Additionally, second shunt resistor 644 is coupled to second phase leg 616 at the DC input stage 620. Second shunt resistor 644 is configured to measure a stator phase current for second phase leg 616. The stator phase current for second phase leg 616 represents a sum of second phase currents for each of the plurality of parallel electric motors 602, 604 . . . 605.

DSP 608 receives the stator phase currents for first phase leg 614 and second phase leg 616 from first and second shunt resistors 642 and 644, respectively. Because each of the motors 602, 604 . . . 605 must have the sum of its phase currents equal to 0, DSP 608 can estimate a stator phase current for third phase leg 618 based on the stator phase currents received from first and second shunt resistors 642 and 644. DSP 608 is further configured to divide the stator phase currents for each of first, second, and third phase legs 614, 616, and 618 by a total number of the plurality of parallel electric motors 602, 604 . . . 605 to determine average stator phase currents in each of the plurality of parallel electric motors 602, 604 . . . 605. Based on the average stator phase currents, DSP 608 generates at least one PWM signal for controlling inverter 610.

Additionally, in one embodiment, the at least two shunt resistors further include a third shunt resistor 646 coupled to third phase leg 618 at the DC input stage 620. Third shunt resistor 646 is configured to measure a stator phase current for third phase leg 618. The stator phase current for third phase leg 618 represents a sum of third phase currents for each of the plurality of parallel electric motors 602, 604 . . . 605.

First, second, and/or third shunt resistors 642, 644, and 646 are communicatively coupled to DSP 608 and provide the respective measured stator currents to DSP 608. Based on the measured stator currents, DSP 608 generates a respective PWM signal 114 for each phase of inverter 610 to generate the three phases of output power (W, U, V) for application to motors 602, 604 . . . 605.

Figure 7:
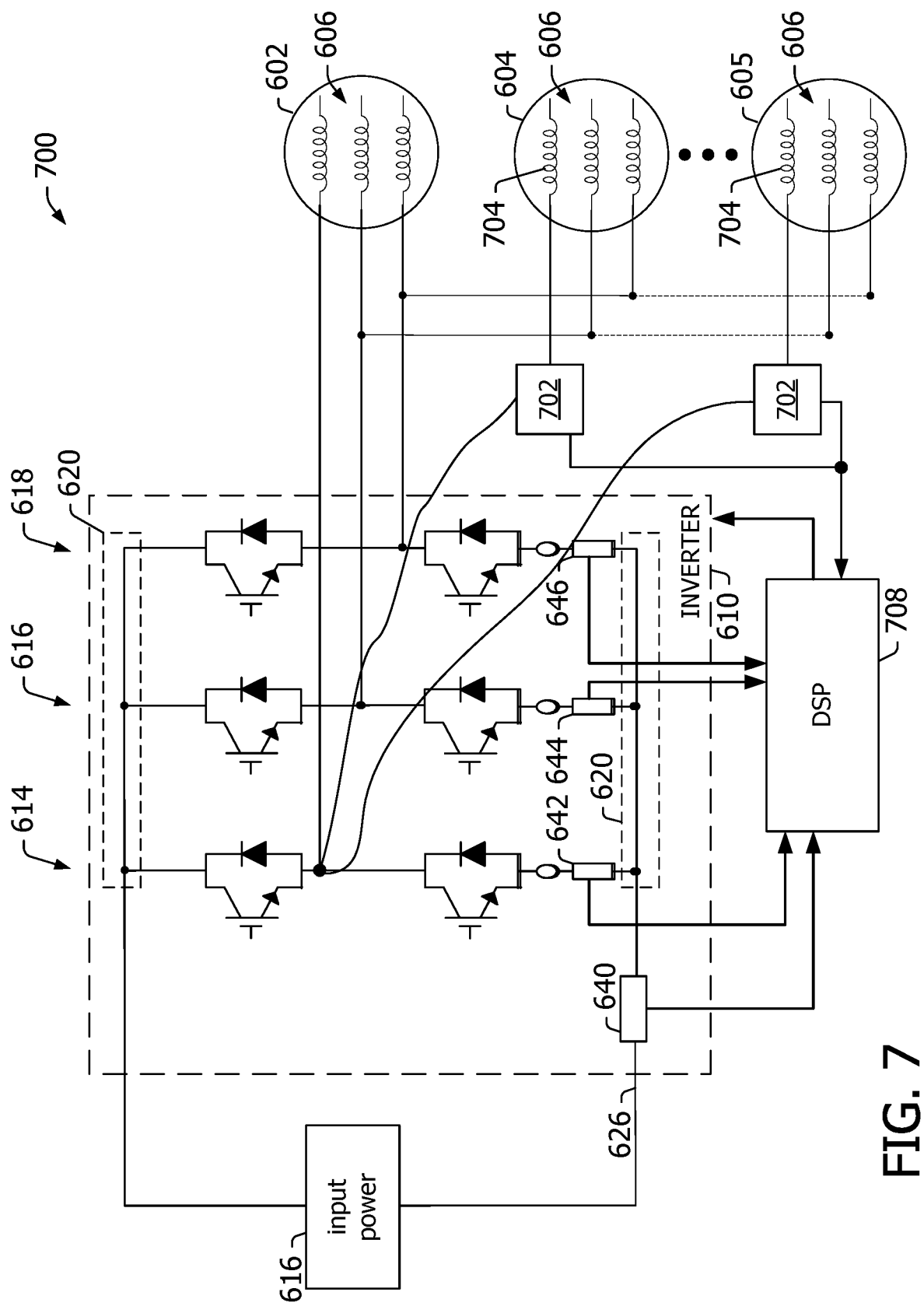
FIG. 7 is a schematic diagram of another exemplary drive circuit for use in the drive circuit shown in FIGS. 1 and 3.

FIG. 7 is a schematic diagram of an exemplary drive circuit 700 for a plurality of parallel electric motors 602, 604 . . . 605. Drive circuit 700 is similar to drive circuit 600 (shown in FIG. 6), except drive circuit 700 includes a second current sensor coupled to the AC output stage of the first phase leg for every parallel electric motor in excess of a first electric motor coupled to drive circuit 700. As such, components shown in FIG. 7 that are substantially similar to components shown in FIG. 6 are labeled with the same reference numbers used in FIG. 6.

In the exemplary embodiment, for every additional motor (i.e., motors 604 . . . 605) coupled to drive circuit 700 in excess of first motor 602, a second current sensor 702 is coupled in-line between first output node 627 and a first stator phase winding 704 of each parallel electric motor 604 . . . 605 in excess of the first electric motor 602. Each second current sensor 702 is configured to measure a first stator phase current in a respective parallel electric motor 604 . . . 605 in excess of first motor 602.

A DSP 708 is configured to receive the measured first stator phase current of second motor 604 from second current sensor 702. Using synchronous motor principles and based on the first stator phase current from second current sensor 702, DSP 708 estimates a second stator phase current and a third stator phase current for motor 604 that is in excess of first motor 602. DSP 708 may repeat this process of determining the phase currents for any additional parallel motors.

Additionally, and as described above with reference to FIG. 6, DSP 708 determines total phase currents output by inverter 610 to all parallel motors 602, 604 . . . 605 using one of shunt resistor 640, first and second shunt resistors 642 and 644, or first, second, and third shunt resistors 642, 644, and 646. DSP 708 is configured to determine differences between the first, second, and third stator phase currents of parallel motor 604 in excess of first motor 602 and respective total stator phase currents output from first, second, and third phase legs 614, 616, and 618. First, second, and third stator phase currents of the first electric motor 602 are reconstructed based on the determined differences. After having determined each stator phase current for each parallel motor, DSP 708 generates at least one PWM signal for controlling inverter 610 based on the stator phase currents.

Figure 8:
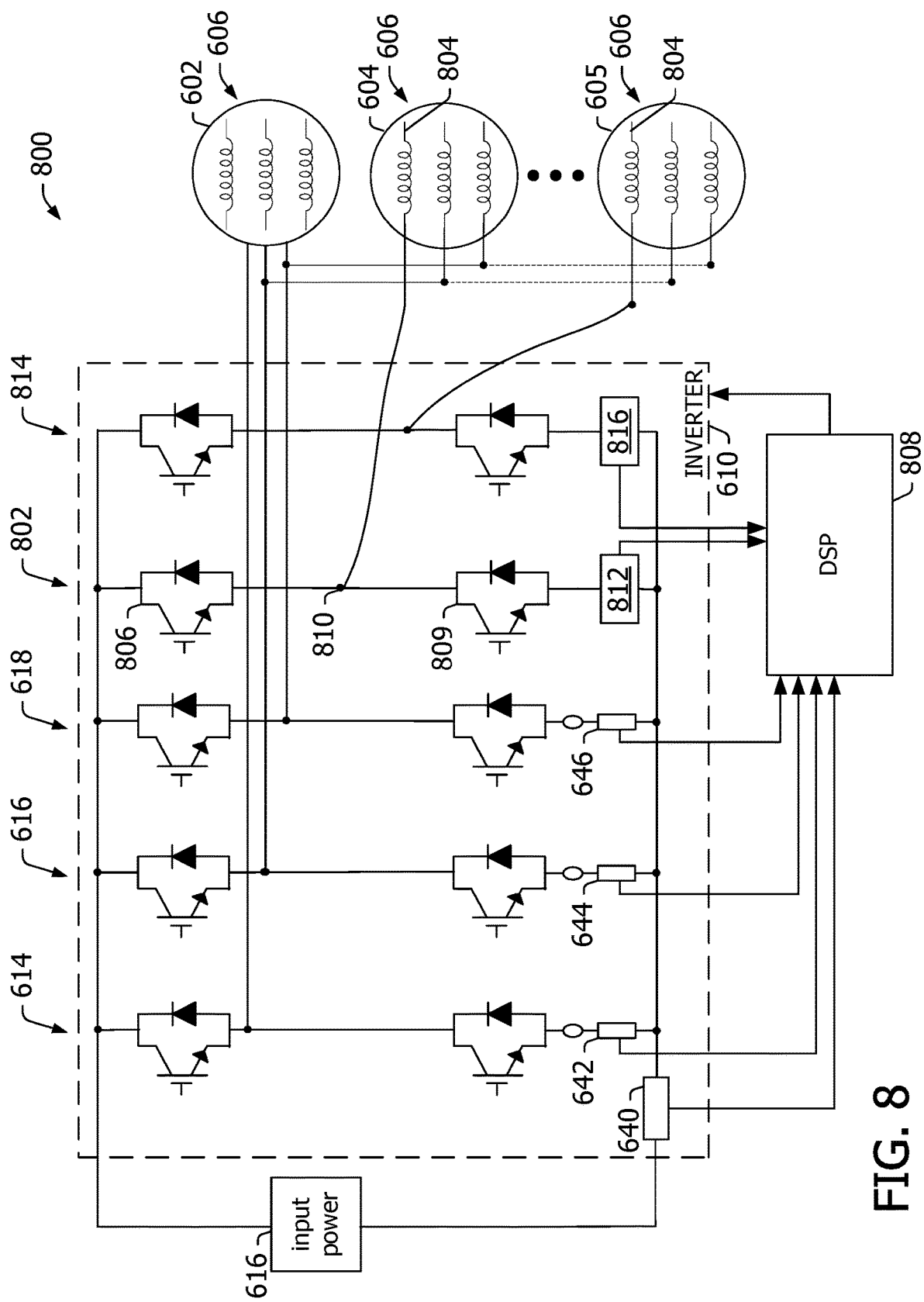
FIG. 8 is a schematic diagram of another exemplary drive circuit for use in the drive circuit shown in FIGS. 1 and 3.

FIG. 8 is a schematic diagram of an exemplary drive circuit 800 for a plurality of parallel electric motors 602, 604 . . . 605. Drive circuit 800 is similar to drive circuit 600 (shown in FIG. 6), except drive circuit 800 includes an additional phase leg for each parallel electric motor in excess of a first electric motor coupled to drive circuit 800. As such, components shown in FIG. 8 that are substantially similar to components shown in FIG. 6 are labeled with the same reference numbers used in FIG. 6.

In the exemplary embodiment, and as shown in FIG. 8, drive circuit 800 includes additional motor 604 that is in excess of first motor 602, so an additional leg, for example, a first additional phase leg 802, is provided within inverter 610. First additional phase leg 802 includes DC input stage 620 and AC output stage 622, wherein AC output stage 622 of first additional phase leg 802 is configured to be coupled to a first stator phase winding 804 of a respective parallel electric motor 604 in excess of first electric motor 602.

First additional leg 802 includes a seventh switch 806 and an eighth switch 809 serially-coupled between positive and negative power bus rails 624 and 626. First additional leg 802 also includes a fourth output node 810 defined between seventh and eighth switches 806 and 809. Fourth output node 810 is configured to be electrically connected to and provide a first phase current to first-phase stator winding 804 of motor 604. Although described herein as being coupleable to a first-phase winding, it is to be understood that the one or more additional legs may instead be configured for coupling to the second phase or the third phase winding connections of motors 604 . . . 605.

In the exemplary embodiment, a second current sensor 812 is coupled to first additional leg 802 at DC input stage 620. Second current sensor 812 is configured to measure a first stator phase current of first additional phase leg 802.

Drive circuit 800 provides two common stator phase currents (i.e., second and third phases) for all motors 602, 604 . . . 605. DSP 808 is configured to independently control first stator phase currents of first electric motor 602 and additional parallel-coupled motor 604 in excess of first motor 602.

Adding an additional phase leg for each additional motor coupled to drive circuit 800 provides an additional degree of freedom per motor, which significantly expands the control capabilities of DSP 808. For example, a minor adjustment of the first phase current would result in an adjustment in the total production of all motors 602, 604 . . . 605, making it easier to maintain stability. Moreover, if there is an imbalance in one of motors 602, 604 . . . 605, DSP 808 may adjust the first phase current within the imbalanced motor. Further, the first phase currents of any additional phase legs may be sensed and used by DSP 808 to monitor motors 604 . . . 605 for proper operation.

For any additional motor(s) parallel-coupled to drive circuit 800, another additional leg is added to inverter 610, the output of which is coupled to first-phase stator winding 804 of the additional motor(s). For example, if nth motor 605 is parallel-coupled to drive circuit 800, a second additional phase leg 814 would be provided in inverter 610. Second additional phase leg 814 includes similar components as and operates substantially similarly to first additional phase leg 802, so the details will not be repeated herein. Also, a third current sensor 816 that functions substantially similarly to second current sensor 812 is coupled to second additional phase leg 814 for measuring a first stator phase current of second additional phase leg 814.

Figure 9:
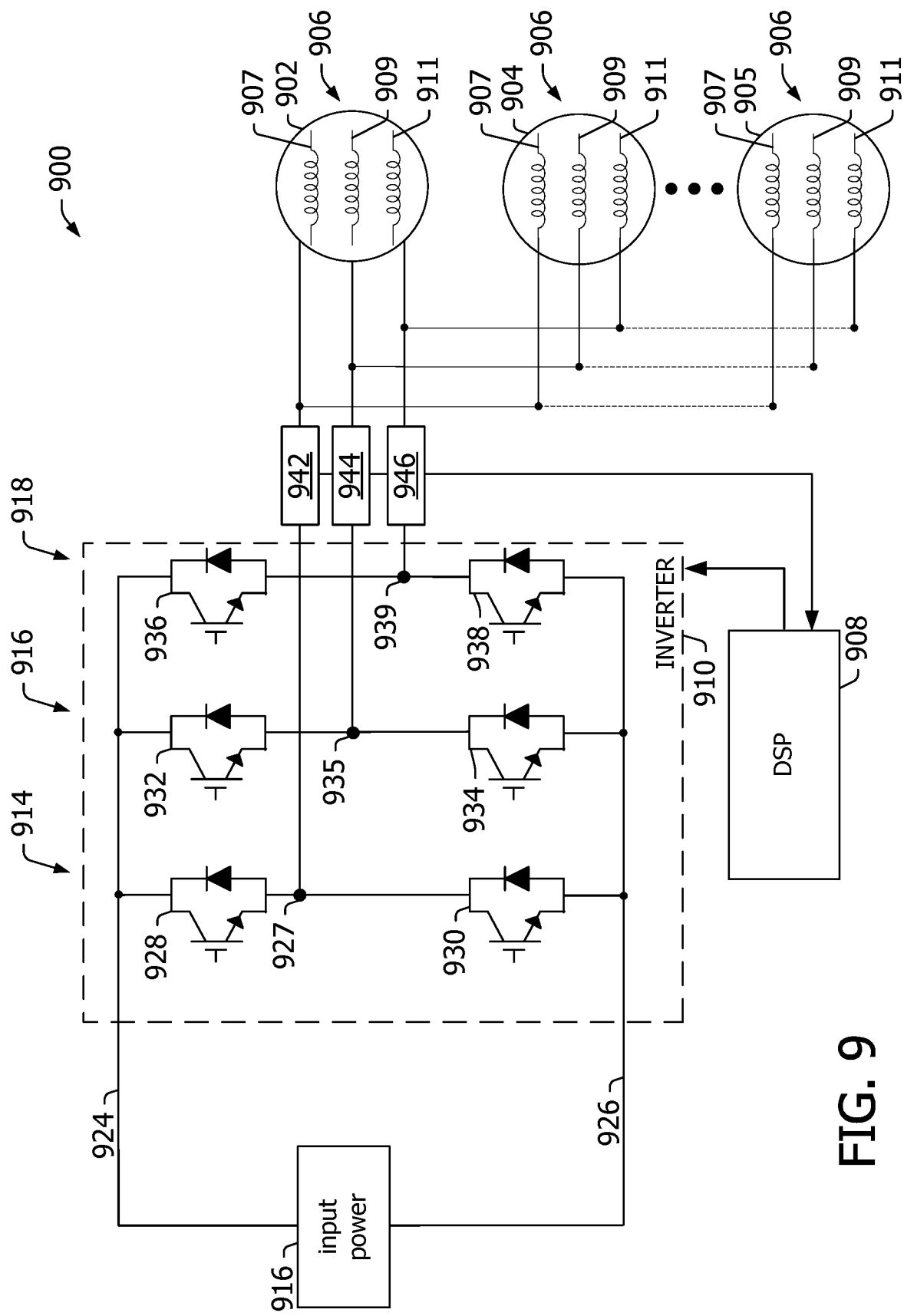
FIG. 9 is a schematic diagram of another exemplary drive circuit for use in the drive circuit shown in FIGS. 1 and 3.

FIG. 9 is a schematic diagram of an exemplary drive circuit 900 for a plurality of parallel electric motors, for example, a first motor 902 and a second motor 904, up to an nth motor 905. Motors 902, 904 . . . 905 may be PM motors, induction motors, or any combination thereof. In certain embodiments, at least one of motors 902, 904 . . . 905 is a PM motor. Each of motors 902, 904 . . . 905 includes a rotor (not shown) and a stator, including stator windings 906. Notably, motors 902, 904 . . . 905 are coupled in parallel to drive circuit 900. Drive circuit 900 includes a DSP 908, an inverter 910, and at least two current sensors 912.

In the exemplary embodiment, inverter 910 is configured to be coupled to and provide three phase power to a plurality of parallel electric motors 902, 904 . . . 905. Inverter 910 is a three-phase voltage source inverter that is configured to convert input power 916 to three-phase power for energizing stator windings 906 of parallel motors 902, 904 . . . 905 based on control signals received from DSP 908. In the exemplary embodiment, at least one of motors 902, 904 ... 905 is a PM motor, while the remaining motors 902, 904 ... 905 may include PM motors and/or induction motors.

In the exemplary embodiment, inverter 910 includes a first phase leg 914, a second phase leg 916, and a third phase leg 918. First, second, and third phase legs 914, 916, and 918 include a DC input stage 920 and an AC output stage 922. DC input stage 920 provides input power 116 to first, second, and third phase legs 914, 916, and 918 via a positive DC link rail 924 and a negative DC link rail 926. AC output stage 922 facilitates outputting stator phase currents from first, second, and third phase legs 914, 916, and 918 of inverter 910 to stator windings 906 of motors 902, 904 ... 905.

More specifically, first phase leg 914 includes a first switch 928 and a second switch 930 serially-coupled between positive and negative DC link rails 924 and 926. A first output node 927 is defined between first and second switches 928 and 930, and is configured to be electrically connected to and provide a first stator phase current to a first stator phase winding 907 of each motor 902, 904 ... 905.

Additionally, second phase leg 916 includes a third switch 932 and a fourth switch 934 serially-coupled between positive and negative DC link rails 924 and 926. A second output node 935 is defined between third and fourth switches 932 and 934, and is configured to be electrically connected to and provide a second phase current to a second stator phase winding 909 of each of motors 902, 904 ... 905.

Moreover, third phase leg 918 includes a fifth switch 936 and a sixth switch 938 serially-coupled between positive and negative DC link rails 924 and 926. A third output node 939 is defined between fifth and sixth switches 936 and 938, and is configured to be electrically connected to and provide a third phase current to a third stator phase winding 911 of each of motors 902, 904 ... 905.

In the exemplary embodiment, at least two current sensors 912 are coupled to inverter 910 and are configured to measure stator phase currents output by inverter 910 for driving the plurality of parallel electric motors 902, 904 ... 905. More specifically, the at least two current sensors 912 are respectively coupled to two phase legs of first, second, and third phase legs 914, 916, and 918. For example, the at least two current sensors 912 may include a first current sensor 942 coupled to first phase leg 914 and a second current sensor 944 coupled to second phase leg 916. However, this orientation is described for exemplary purposes only and it should be understood that first and second current sensors 942 and 944 may be coupled with any orientation to any of first, second, and third phase legs 914, 916, and 918. First current sensor 942 is coupled between the AC output stage 922 of first phase leg 914 and commonly-coupled first stator phase windings 907 of motors 902, 904 ... 905. First current sensor 942 is configured to measure a stator phase current for first phase leg 914. The stator phase current for first phase leg 914 represents a sum of first phase currents for each of the plurality of parallel electric motors 902, 904 ... 905.

Additionally, second current sensor 944 is coupled between the AC output stage 922 of second phase leg 916 and commonly-coupled second stator phase windings 909 of motors 902, 904 ... 905. Second current sensor 944 is configured to measure a stator phase current for second phase leg 916. The stator phase current for second phase leg 916 represents a sum of second phase currents for each of the plurality of parallel electric motors 902, 904 ... 905.

DSP 908 receives the stator phase currents for first phase leg 914 and second phase leg 916 from first and second current sensors 942 and 944, respectively. Because the motors 902, 904 ... 905 are synchronous, DSP 908 can estimate a stator phase current for third phase leg 918 based on the stator phase currents received from first and second current sensors 942 and 944. DSP 908 is further configured to divide the stator phase currents for each of first, second, and third phase legs 914, 916, and 918 by a total number of the plurality of parallel electric motors 902, 904 ... 905 to determine average stator phase currents in each of the plurality of parallel electric motors 902, 904 ... 905. Based on the average stator phase currents, DSP 908 generates at least one PWM signal for controlling inverter 910.

Additionally, in one embodiment, the at least two current sensors 912 further include a third current sensor 946 coupled between the AC output stage 922 of third phase leg 918 and commonly-coupled third stator phase windings 911 of motors 902, 904 ... 905. Third current sensor 946 is configured to measure a stator phase current for third phase leg 918. The stator phase current for third phase leg 918 represents a sum of third phase currents for each of the plurality of parallel electric motors 902, 904 ... 905.

Figure 10:
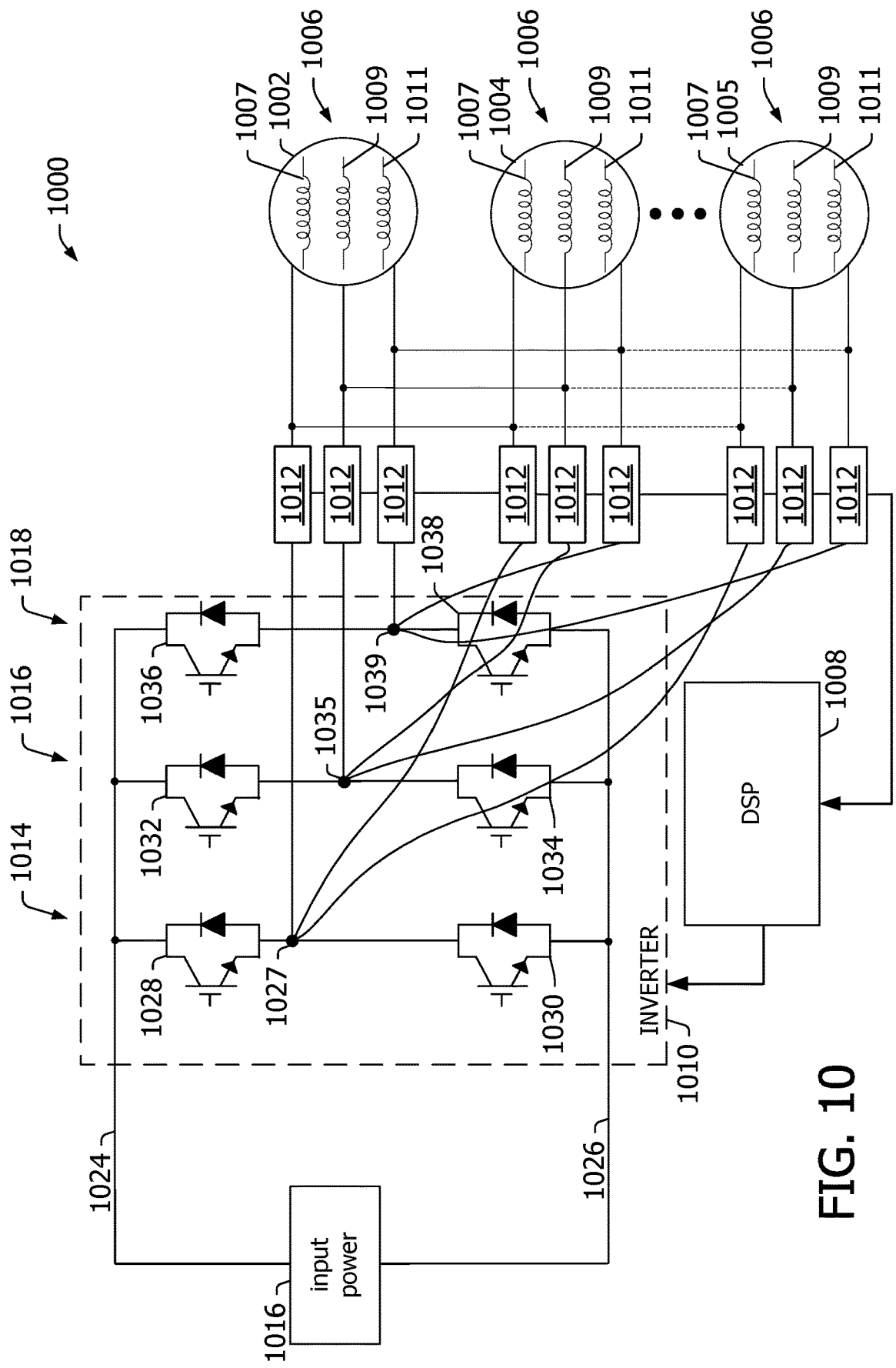
FIG. 10 is a schematic diagram of another exemplary drive circuit for use in the drive circuit shown in FIGS. 1 and 3.

FIG. 10 is a schematic diagram of an exemplary drive circuit 1000 for a plurality of parallel electric motors, for example, a first motor 1002 and a second motor 1004, up to an nth motor 1005. Motors 1002, 1004 ... 1005 may be PM motors, induction motors, or any combination thereof. In certain embodiments, at least one of parallel motors 1002, 1004 ... 1005 is a permanent magnet (PM) motor. Each of motors 1002, 1004 ... 1005 includes a rotor (not shown) and a stator, including stator windings 1006. Notably, motors 1002, 1004 ... 1005 are coupled in parallel to drive circuit 1000. Drive circuit 1000 includes a DSP 1008, an inverter 1010, and at least one current sensor 1012.

In the exemplary embodiment, inverter 1010 is configured to be coupled to and provide three phase power to a plurality of parallel electric motors 1002, 1004 ... 1005. Inverter 1010 is a three-phase voltage source inverter that is configured to convert input power 1016 to three-phase power for energizing stator windings 1006 of parallel motors 1002, 1004 ... 1005 based on control signals received from DSP 608. In the exemplary embodiment, at least one of motors 1002, 1004 ... 1005 is a PM motor, while the remaining motors 1002, 1004 ... 1005 may include PM motors and/or induction motors.

In the exemplary embodiment, inverter 1010 includes a first phase leg 1014, a second phase leg 1016, and a third phase leg 1018. First, second, and third phase legs 1014, 1016, and 1018 include a DC input stage 1020 and an AC output stage 1022. DC input stage 1020 provides input power 116 to first, second, and third phase legs 1014, 1016, and 1018 via a positive DC link rail 1024 and a negative DC link rail 1026. AC output stage 1022 facilitates outputting stator phase currents from first, second, and third phase legs 1014, 1016, and 1018 of inverter 1010 to stator windings 1006 of motors 1002, 1004 ... 1005.

More specifically, first phase leg 1014 includes a first switch 1028 and a second switch 1030 serially-coupled between positive and negative DC link rails 1024 and 1026. A first output node 1027 is defined between first and second switches 1028 and 1030, and is configured to be electrically connected to and provide a first stator phase current to a first-phase stator winding 1006 of each motor 1002, 1004 ... 1005.

Additionally, second phase leg 1016 includes a third switch 1032 and a fourth switch 1034 serially-coupled between positive and negative DC link rails 1024 and 1026. A second output node 1035 is defined between third and fourth switches 1032 and 1034, and is configured to be electrically connected to and provide a second phase current to a second-phase stator winding 1006 of each of motors 1002, 1004 . . . 1005.

Moreover, third phase leg 1018 includes a fifth switch 1036 and a sixth switch 1038 serially-coupled between positive and negative DC link rails 1024 and 1026. A third output node 1039 is defined between fifth and sixth switches 1036 and 1038, and is configured to be electrically connected to and provide a third phase current to a third-phase stator winding 1006 of each of motors 1002, 1004 . . . 1005.

In the exemplary embodiment, drive circuit 1000 includes an independent current sensor 1012 coupled in-line with at least one phase leg output of each paralleled motor 1002, 1004 . . . 1005. For example, for motor 1002, drive circuit 1000 includes current sensor 1012 for measuring current of at least one phase of motor 1002. More specifically, in the exemplary embodiment, current sensor 1012 is coupled between first output node 1027 and first phase stator winding 1007 of motor 1002. Additionally, or alternatively, drive circuit 1000 includes an additional current sensor 1012 coupled between second output node 1035 and second phase stator winding 1009 of motor 1002. Additionally, or alternatively, drive circuit 1000 further includes a third current sensor 1012 coupled between third output node 1039 and third phase stator winding 1011 of motor 1002.

Moreover, in the exemplary embodiment, for motor 1004, drive circuit 1000 includes current sensor 1012 for measuring current of at least one phase of motor 1004. More specifically, in the exemplary embodiment, current sensor 1012 is coupled between first output node 1027 and first phase stator winding 1007 of motor 1004. Additionally, or alternatively, drive circuit 1000 includes an additional current sensor 1012 coupled between second output node 1035 and second phase stator winding 1009 of motor 1004. Additionally, or alternatively, drive circuit 1000 further includes a third current sensor 1012 coupled between third output node 1039 and third phase stator winding 1011 of motor 1004.

In the embodiments where only one current sensor 1012 is used for each of motors 1002 and 1004, one or more current reconstruction algorithms are implemented by DSP 1008 to reconstruct the other two phase currents for each of motor 1002 and 1004. Where two current sensors 1012 are used for each of motors 1002 and 1004, because the motors are synchronous, DSP 1008 can estimate the third phase currents for motors 1002 and 1004 based on the two measured stator phase currents. Finally, where current sensors 1012 are used on all three phases of each motor 1002 and 1004, every stator phase current is measured for each motor 1002 and 1004, and, accordingly, DSP 1008 does not have to perform phase current estimation/calculation and/or current reconstruction.

Having independent current sensing on one or more phases of each parallel motor provides DSP 1008 with greater control over motors 1002, 1004 . . . 1005. For example, phase angles between phase currents may be selectively adjusted to achieve synchronous operation of the motors. Further, measured stator currents may be compared to one another to confirm proper motor operation.

Figure 11:
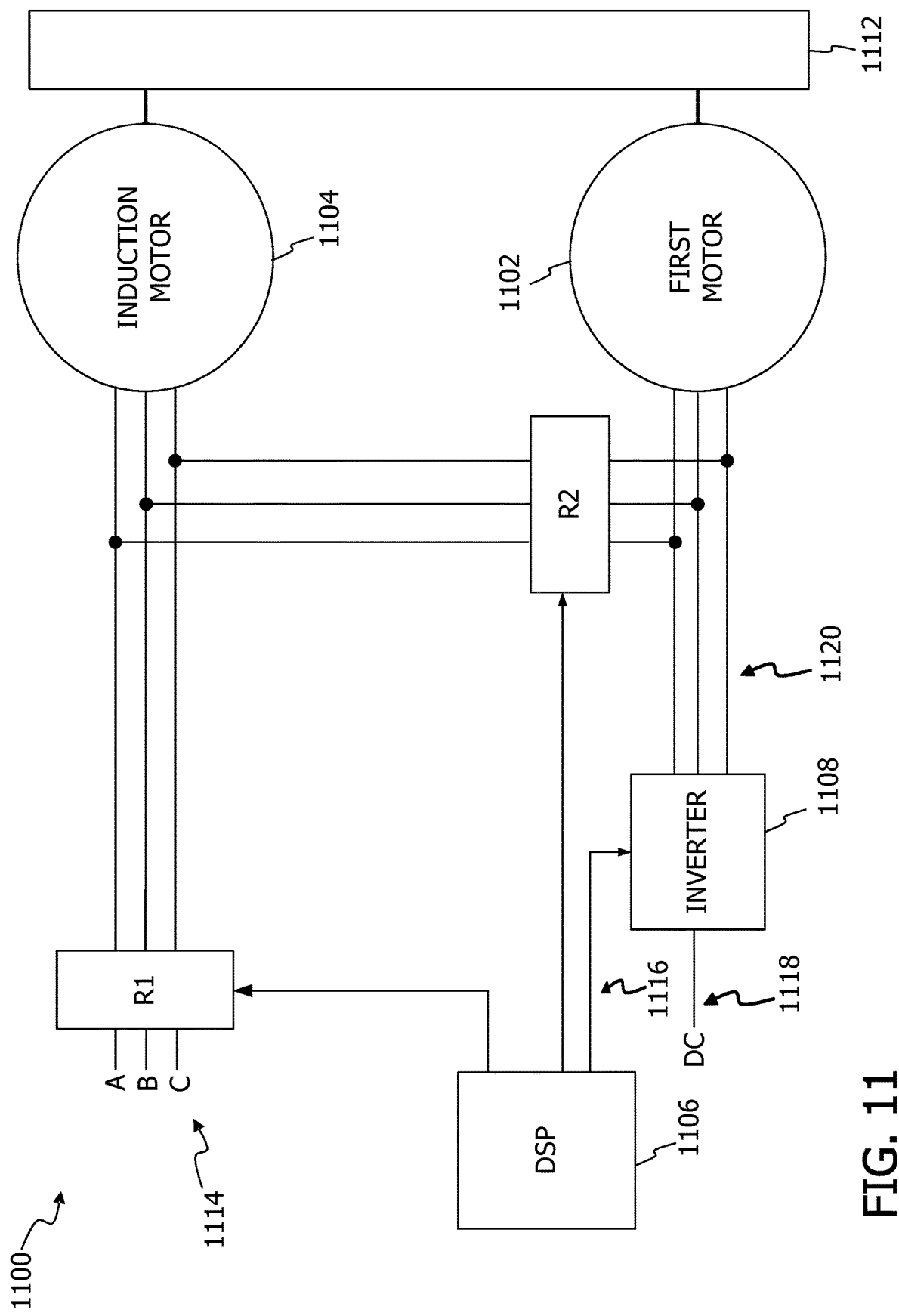
FIG. 11 is a schematic diagram of an exemplary drive circuit for a parallel first motor and at least one induction motor.

FIG. 11 is a schematic diagram of an exemplary drive circuit 1100 for a first motor 1102 in parallel with an induction motor 1104. In the exemplary embodiment, first motor 1102 may be either a PM motor or an induction motor. Drive circuit 1100 includes a DSP 1106 coupled to and configured to control an inverter 1108 and relays R1 and R2. In some embodiments, the states of relays R1 and R2 may be commanded by a system controller that also transmits a command signal to DSP 1106. In other embodiments, control of relays R1 and R2 may be shared between DSP 1106 and the system controller.

DSP 1106 determines how to operate first motor 1102 and induction motor 1104 based on a detected load 1112 on the motors. DSP 1106, in certain embodiments, may quantify load 1112 based on measurements external to drive circuit 1100, such as, for example, ambient air temperature in an HVAC system. In alternative embodiments, DSP 1106 may quantify load 1112 based on power output to first motor 1102 and induction motor 1104, such as, for example, monitoring current delivered to first motor 1102 and induction motor 1104.

Drive circuit 1100 enables operation of first motor 1102 and induction motor 1104 in one of two modes, and further enables transition among those modes. In the exemplary embodiment, first motor 1102 is coupled to and is driven using variable speed by inverter 1108 or may be driven by the power source when the inverter is in the off state. Induction motor 1104 may be driven in parallel with first motor 1102 through inverter 1108, or directly across a three-phase AC line-frequency power 1114, which may be supplied, for example, by a three-phase generator or a utility. Operating induction motor 1104 directly across three-phase AC line-frequency power 1114 enables the greatest power output from induction motor 1104 and is selected by DSP 1106 under full loading, e.g., load 1112 is at its greatest. Operating induction motor 1104 through inverter 1108 enables induction motor 1104 to operate at a lower torque output to meet partial loads.

DSP 1106 controls inverter 1108 to operate first motor 1102 as described above with respect to drive circuit 300, shown in FIG. 3. More specifically, in the exemplary embodiment, DSP 1106 uses vector control, such as vector control algorithm 322 shown in FIG. 3 or method 500 shown in FIG. 5, to compute a complex command voltage vector that is the basis for a PWM signal 1116 that is transmitted to inverter 1108 to control inverter 1108. In other embodiments, DSP 1106 may use scalar control for induction motor 1104, or any other known technique commonly used to vary speed of induction motors. Inverter 1108, based on PWM signal 1116, converts a DC input power 1118 into a three-phase output power 1120 that is supplied to the stator windings (not shown) of first motor 1102. In certain embodiments, drive circuit 1100 may operate one or more additional PM or induction motors in parallel with first motor 1102 and using DSP 1106 and inverter 1108. In such embodiments where motors are in parallel with a PM motor, as described above with respect to drive circuit 300, DSP 1106 determines which of the parallel PM motors is generating the greatest torque output, and selects that PM motor as the target PM motor on which vector control operates. DSP 1106 then controls inverter 1108 to operate each of the parallel PM motors using the same complex command voltage vector and corresponding PWM signal.

DSP 1106 controls the configuration of relays R1 and R2 to select a mode of operation of first motor 1102 and induction motor 1104. Relays R1 and R2 may be any suitable power switching devices suitable for coupling and decoupling AC power sources, such as three-phase AC line-frequency power 1114 or inverter 1108, to first motor 1102 and induction motor 1104.

DSP 1106 operates first motor 1102 and induction motor 1104 in parallel by closing relay R2 and opening relay R1. Relay R1 operates to isolate inverter 1108, first motor 1102, and induction motor 1104 from three-phase AC line-frequency power 1114. Relay R2 couples induction motor 1104 to three-phase output power 1120 produced by inverter 1108.

DSP 1106 operates induction motor 1104 directly across three-phase AC line-frequency power 1114 by opening relay R2 and closing relay R1. Relay R2 isolates inverter 1108 and first motor 1102 from three-phase AC line-frequency power 1114. Relay R1 couples induction motor 1104 directly to three-phase AC line-frequency power 1114.

In an alternative embodiment, first motor 1102 is an induction motor. Drive circuit 1100 may further include a third relay (not shown) coupled to an output of inverter 1108. In this embodiment, drive circuit 1100 enables operation of first motor 1102 and induction motor 1104 in a third mode, where first motor 1102 and induction motor 1104 are both coupled directly across three-phase AC line-frequency power 1114.

DSP 1106 operates first (induction) motor 1102 and induction motor 1104 directly across three-phase AC line-frequency power 1114 by opening the third relay and closing relays R1 and R2. Relays R1 and R2 couple first motor 1102 and induction motor 1104 directly to three-phase AC line-frequency power 1114. The third relay isolates inverter 1108 from three-phase AC line-frequency power 1114 for protection purposes. It is to be understood that in embodiments where first motor 1102 is a PM motor, it will always be coupled to and driven by inverter 1108. Accordingly, the third relay is not necessary when first motor 1102 is a PM motor. It is also to be understood that the third relay is not a necessary element of the implementation as keeping the inverter power electronic switches in the OFF state would achieve similar functionality.

Figure 12:
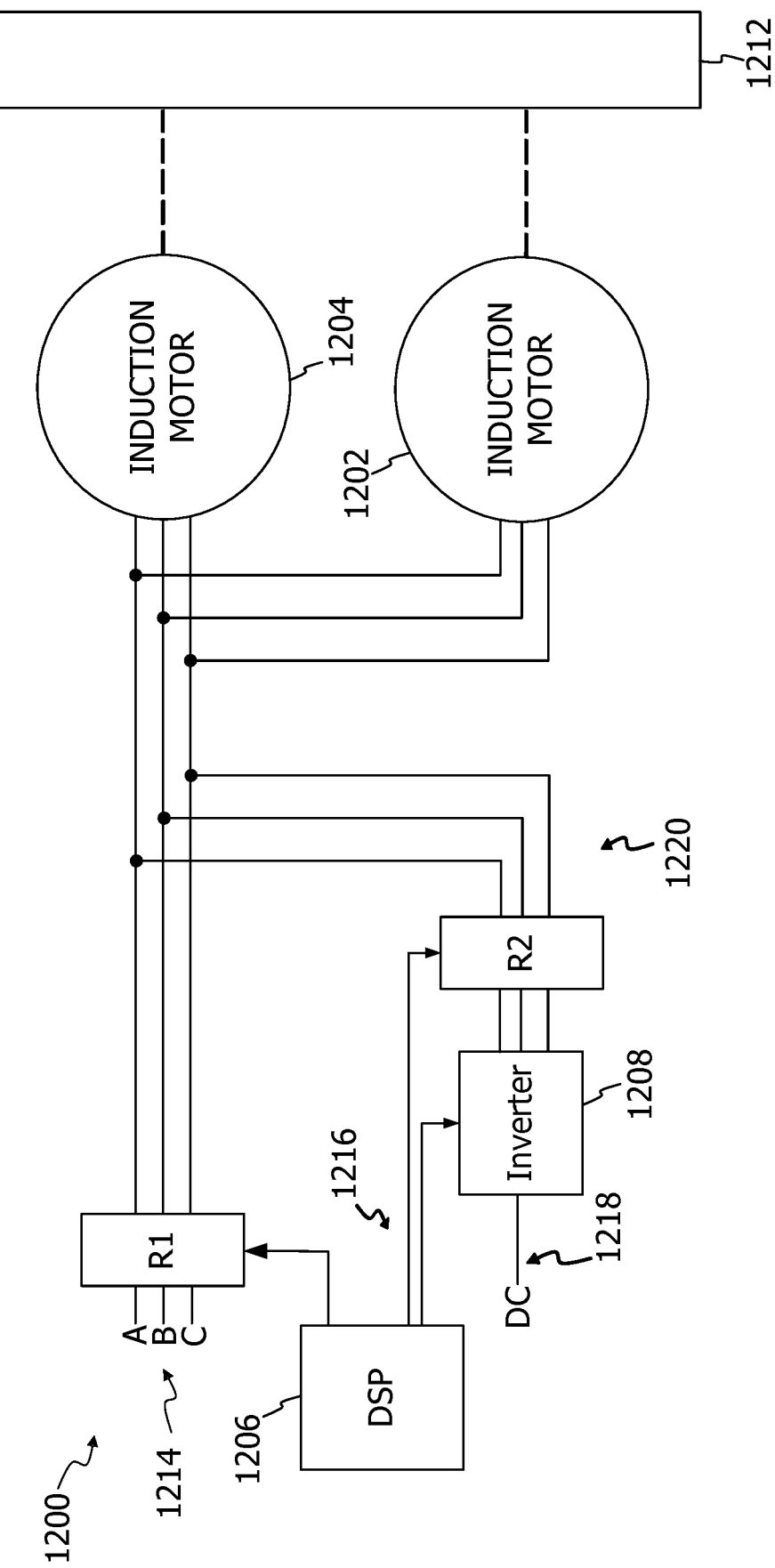
FIG. 12 is a schematic diagram of an exemplary drive circuit for a parallel first induction motor and at least one additional induction motor.

FIG. 12 is a schematic diagram of an exemplary drive circuit 1200 for a first induction motor 1202 in parallel with a second induction motor 1204. Drive circuit 1200 includes a DSP 1206 coupled to and configured to control an inverter 1208 and relays R1 and R2. In some embodiments, the states of relays R1 and R2 may be commanded by a system controller that also transmits a command signal to DSP 1106. In other embodiments, control of relays R1 and R2 may be shared between DSP 1106 and the system controller.

DSP 1206 determines how to operate first induction motor 1202 and second induction motor 1204 based on a detected load 1212 on the motors. DSP 1206, in certain embodiments, may quantify load 1212 based on measurements external to drive circuit 1200, such as, for example, ambient air temperature in an HVAC system. In alternative embodiments, DSP 1206 may quantify load 1212 based on power output to first induction motor 1202 and second induction motor 1204, such as, for example, monitoring current delivered to first induction motor 1202 and second induction motor 1204.

Drive circuit 1200 enables operation of first induction motor 1202 and induction motor 1204 in one of two modes, and further enables transition among those modes. First induction motor 1202 and second induction motor 1204 may be driven in parallel using variable speed by inverter 1208, or directly across a three-phase AC line-frequency power 1214, which may be supplied, for example, by a three-phase generator or a utility.

DSP 1206 controls inverter 1208 to operate first induction motor 1202 using either vector control or scalar control. DSP 1206 controls the configuration of relays R1 and R2 to select a mode of operation of first induction motor 1202 and second induction motor 1204. Relays R1 and R2 may be any suitable power switching devices suitable for coupling and decoupling AC power sources, such as three-phase AC line-frequency power 1214 or inverter 1208, to first induction motor 1202 and second induction motor 1204.

DSP 1206 operates first induction motor 1202 and second induction motor 1204 in parallel by closing relay R2 and opening relay R1. Relay R1, when opened, operates to isolate inverter 1208, first induction motor 1202, and second induction motor 1204 from three-phase AC line-frequency power 1214. Closing relay R2 couples three-phase output power 1220 produced by inverter 1208 to both first induction motor 1202 and second induction motor 1204.

DSP 1206 operates first induction motor 1202 and second induction motor 1204 directly across three-phase AC line-frequency power 1214 by opening relay R2 and closing relay R1. Opening relay R2 isolates inverter 1208 from three-phase AC line-frequency power 1214. Closing relay R1 couples first induction motor 1202 and second induction motor 1204 directly to three-phase AC line-frequency power 1214.

In certain embodiments, drive circuit 1200 may operate one or more additional induction motors in parallel with first induction motor 1202 and second first induction motor 1204 and using DSP 1206 and inverter 1208.

Figure 13:
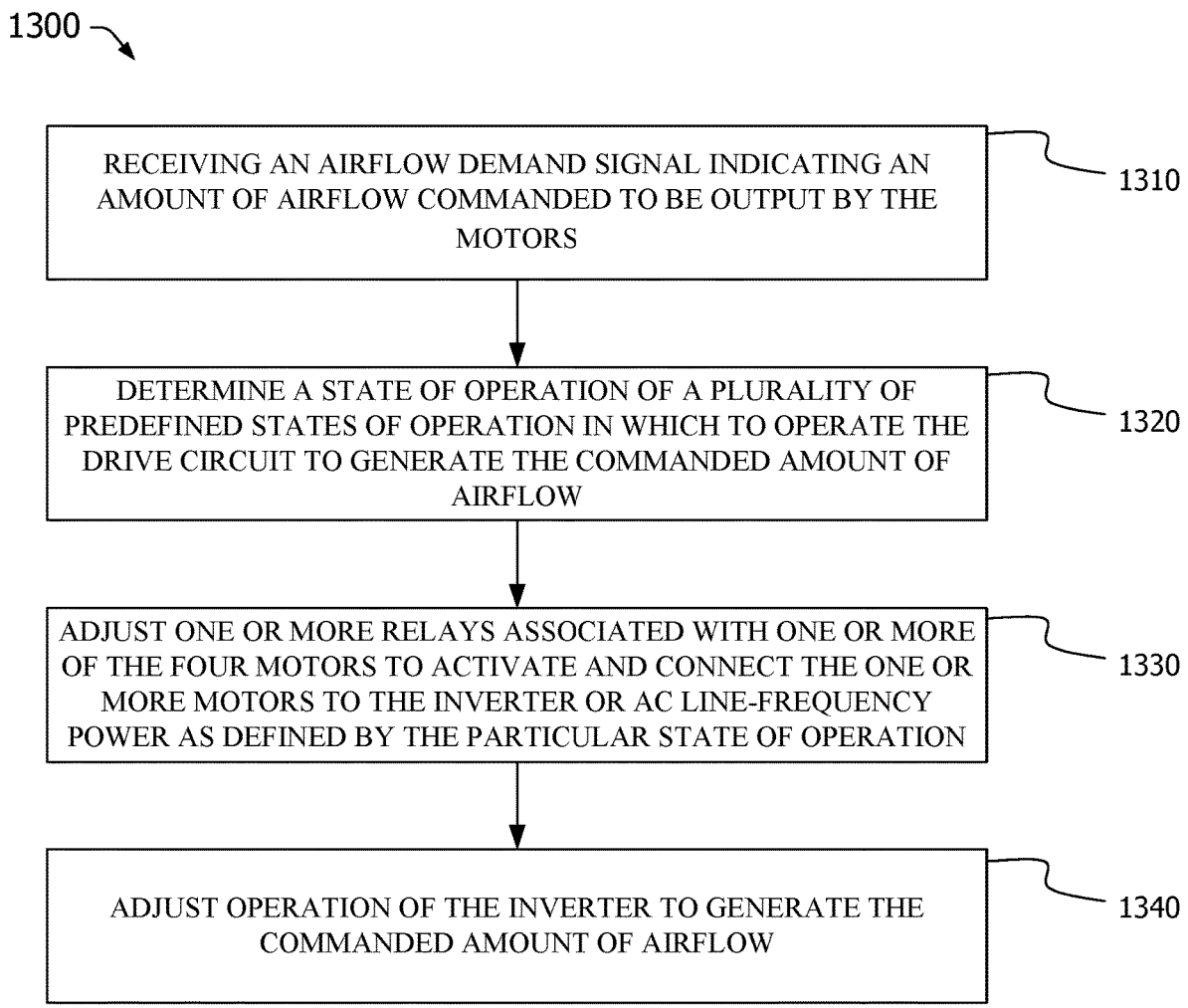
FIG. 13 is a flow chart illustrating a fluid flow control method for controlling the drive circuits shown in FIG. 11 or FIG. 12.
Figure 14:
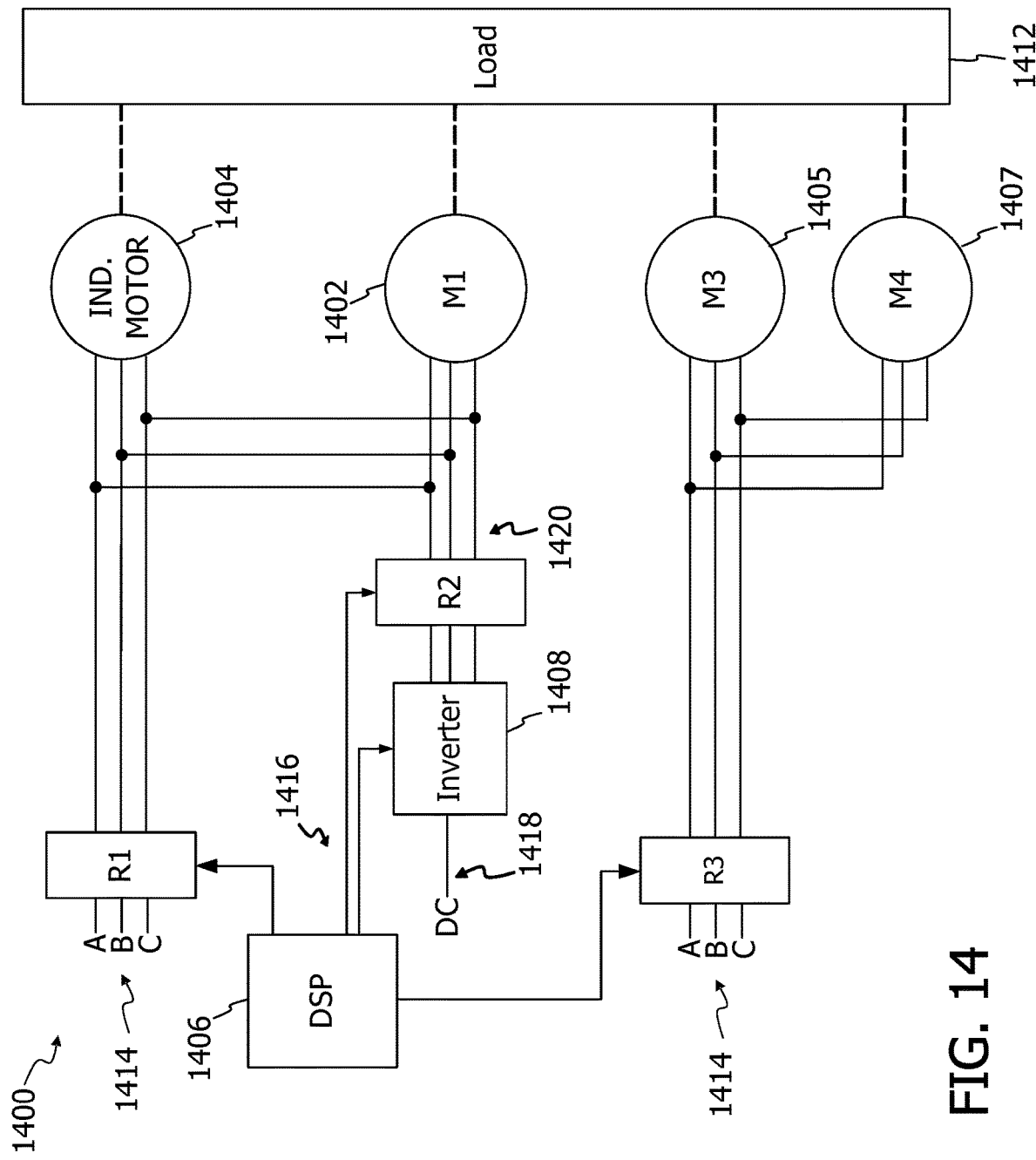
FIG. 14 is a schematic diagram of an exemplary drive circuit for a parallel first motor, induction motor, a third motor, and a fourth motor.

FIG. 13 is a flow chart illustrating a fluid flow control method 1300 for controlling a drive circuit having one or more motors coupled in parallel. FIG. 14 is a schematic diagram of an exemplary drive circuit for a paralleled first motor, an induction motor, a third motor, and a fourth motor. Method 1300 may be used for controlling drive circuit 1100 (shown in FIG. 11), drive circuit 1200 (shown in FIG. 12), or drive circuit 1400. However, method 1300 will be described herein with reference only to drive circuit 1400 of FIG. 14.

Method 1300 is described herein as being applied in controlling a four-motor chiller. Although a four-motor chiller is described, it is to be understood that the number of motors may be scaled as necessary or expanded out for use in other applications.

In the exemplary embodiment, method 1300 facilitates controlling two or more parallel-coupled motors, such as first motor 1402 and induction motor 1404, a third motor 1405, and a fourth motor 1407 in various operating modes using combinations of using a single inverter 1408 and AC line-frequency power 1414 for higher output. Third and fourth motors 1405 and 1407 are parallel-coupled and are selectively coupleable across AC line-frequency power 1114 using additional relay R3.

Method 1300 facilitates operating the motors in various operating states including operating one or more motors using the inverter, operating some combination of the motors across line power and others using the inverter, and operating all motors across line power. Method 1300 enables using a single inverter for driving two or more of the motors, eliminating the necessity of having to purchase drive circuits sized for full power that are more expensive, drives designed for lower efficiency motors, and/or drives that require additional customer tuning and specialized installation, and enables operating one or more additional motors using line power.

In the exemplary embodiment, method 1300 includes receiving 1310, by DSP 1406, a demand signal indicating a command for the motor outputs. This demand could take the form of a torque demand, a speed demand, or a fluid flow demand. The demand signal may be received from a system controller, a thermostat, user input, or the like.

Based on the demand signal, DSP 1406 determines 1320 a state of operation of a plurality of predefined states of operation in which to operate drive circuit 1400 to generate the commanded output. Each state of operation specifies which of the four motors are activated and of those activated, which are operated using inverter 1408 and which are connected directly to AC line-frequency power 1414.

For example, in a first state of operation associated with a first, or lowest, demand, only first motor 1402 is operated, and is operated using inverter 1408. This enables operation of first motor 1402 at a desired speed that less-than-full speed of first motor 1402 to generate a first amount of fluid flow.

In a second state of operation associated with a second demand that is higher than the first demand, first motor 1402 and induction motor 1404 are operated, both using inverter 1408. Operating first motor 1402 and induction motor 1404 in parallel at less-than-full speed facilitates generating a second amount of fluid flow that is higher than the first amount of fluid flow from the first state of operation.

In a third state of operation associated with a third demand that is higher than the second demand, first motor 1402 is operated using inverter 1408 and induction motor 1404 is operated directly across AC line-frequency power 1414. Operating first motor 1402 at less-than-full speed and induction motor 1404 at full speed facilitates generating a third amount of fluid flow that is higher than the second amount of fluid flow from the second state of operation.

In a fourth state of operation associated with a fourth demand that is higher than the third demand, first motor 1402 and induction motor 1404 are operated using inverter 1408 and third motor 1405 is operated directly across AC line-frequency power 1414. Operating first motor 1402 and induction motor 1404 at less-than-full speed and third motor 1405 at full speed facilitates generating a fourth amount of fluid flow that is higher than the third amount of fluid flow from the third state of operation.

In a fifth state of operation associated with a fifth demand that is higher than the fourth demand, first motor 1402 is operated using inverter 1408, and induction motor 1404 and third motor 1405 are operated directly across AC line-frequency power 1414. Operating first motor 1402 at less-than-full speed in combination with induction motor 1404 and third motor 1405 at full speed facilitates generating a fifth amount of fluid flow that is higher than the fourth amount of fluid flow from the fourth state of operation.

In a sixth state of operation associated with a sixth demand that is higher than the fifth demand, first motor 1402 is operated using inverter 1408, and induction motor 1404, third motor 1405, and fourth motor 1407 are operated directly across AC line-frequency power 1414. Operating first motor 1402 at less-than-full speed in combination with induction motor 1404, third motor 1405, and fourth motor 1407 at full speed facilitates generating a sixth amount of fluid flow that is higher than the fifth amount of fluid flow from the fifth state of operation.

In a seventh state of operation associated with a seventh, or highest, demand that is higher than the sixth demand, first motor 1402, induction motor 1404, third motor 1405, and fourth motor 1407 are all operated directly across AC line-frequency power 1414. Operating all of first motor 1402, induction motor 1404, third motor 1405, and fourth motor 1407 at full speed facilitates generating a seventh amount of fluid flow that is higher than the sixth amount of fluid flow from the sixth state of operation.

To apply the determined state of operation to the motors, one or more of the relays are activated, or closed, to couple one or more of the motors to either inverter 1408 or AC line-frequency power 1414 as defined by the particular state of operation. In the exemplary embodiment, the relays are controlled either by DSP 1406 or an external system controller.

Based on the received fluid flow demand signal, DSP 1406 adjusts 1340 operation of inverter 1408 to output three-phase voltage to first motor 1402 and in some operating states, induction motor 1404, to generate the commanded amount of fluid flow.

The methods and systems described herein may be implemented using computer programming or engineering techniques including computer software, firmware, hardware or any combination or subset thereof, wherein the technical effect may include at least one of: (a) enabling operation of parallel induction or PM motors with a single inverter or drive device; (b) improving operating efficiency of parallel motors through use of PM motors; (c) reducing complexity of drive circuits for parallel induction or PM motors; (d) reducing cost of parallel induction or PM motor applications; and (e) reducing configuration and installation complexity of parallel motor applications.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a drive circuit for parallel electric motors, at least one of which is a permanent magnet (PM) motor, said method comprising:
   receiving measurements of stator phase currents in the parallel electric motors;
   selecting a target PM motor, from among the parallel electric motors, that generates a largest torque output;
   executing a vector control algorithm to generate a complex command voltage vector for the target PM motor;
   generating and transmitting a pulse width modulation (PWM) signal based on the complex command voltage vector for controlling an inverter; and
   operating the inverter according to the PWM signal to supply three-phase alternating current (AC) power to the parallel electric motors.

2. The method of claim 1, wherein selecting a target PM motor comprises:
   comparing respective stator phase currents for the parallel electric motors; and
   determining which of the parallel electric motors is drawing the greatest torque producing current through its stator windings.

3. The method of claim 1, wherein operating the inverter further comprises supplying the three-phase AC power to at least one parallel PM motor other than the target PM motor.

4. The method of claim 3, wherein supplying the three-phase AC power to the at least one parallel PM motor further comprises dissipating excess current in the form of an additional flux current.

5. The method of claim 1, wherein operating the inverter further comprises supplying the three-phase AC power to at least one parallel induction motor.

6. The method of claim 1 further comprising:
   receiving at least one stator phase current measurement; and
   computing at least one stator phase current measurement based on the at least one received stator phase current measurement.

7. A drive circuit for parallel electric motors, at least one of which is a permanent magnet (PM) motor, said drive circuit comprising:
   an inverter coupled to the parallel electric motors and configured to supply an alternating current (AC) signal to stator windings thereof based on a PWM signal; and
   a digital signal processor (DSP) coupled to said inverter and configured to:
      receive respective stator phase current measurements for the parallel electric motors;
      select a target PM motor, of the parallel electric motors, having a largest torque output among the parallel electric motors;
      execute a vector control algorithm to generate a complex command voltage vector for the target PM motor;
      generate the PWM signal based on the complex command voltage vector for the target PM motor; and
      transmit the PWM signal to said inverter to operate said inverter and supply the AC signal to the stator windings of the parallel electric motors.

8. The drive circuit of claim 7, wherein said DSP is further configured to select the target PM motor based on the respective stator phase current measurements for the target PM motor exceeding the respective stator phase current measurements for each other PM motor among the parallel electric motors.

9. The drive circuit of claim 7, wherein said DSP is further configured to:
   receive at least one stator phase current measurement for a given electric motor among the parallel electric motors; and
   compute at least one other stator phase current measurement for the given electric motor.

10. The drive circuit of claim 7, wherein said inverter comprises three phase legs for generating a three-phase AC output power to be delivered to the parallel electric motors.

11. The drive circuit of claim 10, wherein said DSP is further configured to generate respective PWM signals for controlling each of said three phase legs.

12. The drive circuit of claim 7, wherein said DSP, when executing the vector control algorithm, is further configured to:
   determine a rotor position for the target PM motor;
   determine a rotor angle for the target PM motor based on the rotor position, respective stator phase currents for the target PM motor, and an electrical parameter of the stator windings of the target PM motor;
   transform the respective stator phase currents for the target PM motor into a flux-torque coordinate system in a rotating rotor reference frame based on the rotor angle;
   compute commanded flux and torque voltage components based on the transformed respective stator phase currents for the target PM motor; and
   compute the complex command voltage vector based on the commanded flux and torque current components.

13. The drive circuit of claim 7, wherein said inverter is coupled to at least one induction motor among the parallel electric motors, and wherein said inverter is further configured to supply the AC signal to the stator windings thereof based on the PWM signal.

14. The drive circuit of claim 7, wherein said inverter, in supplying the AC signal to the stator windings of the parallel electric motors other than the target PM motor, is further configured to dissipate excess current in the stator windings in the form of an additional flux current.

15. The drive circuit of claim 13, wherein said DSP is further configured to selectively operate at least one induction motor in parallel with the target PM motor through said inverter.

16. The drive circuit of claim 15, wherein said DSP is further configured to selectively operate the at least one induction motor using line frequency power.

17. A system, comprising:
   a first three-phase motor configured to drive a load;
   an inverter coupled to said first three-phase motor and configured to supply a three-phase output power thereto;

an induction motor configured to drive the load, and further configured to be selectively coupled in parallel to said first three-phase motor and said inverter;

a three-phase AC line-frequency bus configured to be selectively coupled to said induction motor; and a digital signal processor (DSP) coupled to said inverter and configured to:

selectively, when in a direct operating mode, couple said induction motor to said three-phase AC line-frequency bus, and decouple said induction motor from said first three-phase motor and said inverter;

selectively, when in a parallel operating mode, couple said induction motor to said inverter, and decouple said induction motor from said three-phase AC line-frequency bus;

control said inverter to supply the three-phase output power from said inverter to said first three-phase motor; and control said inverter to supply the three-phase output power from said inverter to said induction motor when in the parallel operating mode.

18. The system of claim 17, wherein said DSP is further configured to select one of the direct operating mode and the parallel operating mode based on a quantification of the load.

19. The system of claim 17, wherein said first three-phase motor comprises a permanent magnet motor.

20. The system of claim 17, wherein said first three-phase motor comprises a second induction motor.

21. The system of claim 20, wherein said DSP is further configured to selectively, when in the direct operating mode, couple said second induction motor to said three-phase AC line-frequency bus.

22. The system of claim 21 further comprising a third induction motor configured to drive the load, and a fourth induction motor configured to drive the load, the third and fourth induction motors configured to be selectively coupled in parallel to said three-phase AC line-frequency bus.

23. The system of claim 22, wherein said inverter has an operating capacity that is less than the aggregate operating capacity of all motors configured to drive the load.

24. A method of controlling fluid flow generated by fluid-moving equipment driven by a plurality of motors, said method comprising:

receiving a fluid flow demand signal indicating an amount of fluid flow commanded to be output by the fluid-moving equipment driven by the plurality of motors;

determining a state of operation, of a plurality of pre-defined states of operation, in which to operate a drive circuit coupled to the plurality of motors to generate the commanded amount of fluid flow;

adjusting at least one relay associated with at least one motor of the plurality of motors to activate and selectively couple the at least one motor to an inverter or an AC line-frequency power according to the determined state of operation; and adjusting operation of the inverter to generate the commanded amount of fluid flow.

\* \* \* \* \*